United States Patent
Liu et al.

(10) Patent No.: US 11,564,128 B2
(45) Date of Patent: Jan. 24, 2023

(54) SPLITTING AN INFORMATION BLOCK INTO SUB-BLOCKS

(71) Applicant: NTT DOCOMO, INC., Tokyo (JP)

(72) Inventors: Wenjia Liu, Beijing (CN); Runxin Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 50 days.

(21) Appl. No.: 17/266,453

(22) PCT Filed: Aug. 6, 2018

(86) PCT No.: PCT/CN2018/098946
§ 371 (c)(1),
(2) Date: Feb. 5, 2021

(87) PCT Pub. No.: WO2020/029007
PCT Pub. Date: Feb. 13, 2020

(65) Prior Publication Data
US 2021/0297900 A1    Sep. 23, 2021

(51) Int. Cl.
*H04W 28/06* (2009.01)
*H04L 1/00* (2006.01)

(52) U.S. Cl.
CPC .......... *H04W 28/06* (2013.01); *H04L 1/0003* (2013.01); *H04L 1/0009* (2013.01)

(58) Field of Classification Search
CPC ..... H04L 47/43; H04L 69/166; H04L 1/0003; H04L 1/0009; H04W 28/06
See application file for complete search history.

(56) References Cited

U.S. PATENT DOCUMENTS

| | | | |
|---|---|---|---|
| 2017/0290008 A1* | 10/2017 | Tooher | H04W 72/0446 |
| 2019/0260501 A1* | 8/2019 | Kim | H04L 1/0005 |
| 2020/0028523 A1* | 1/2020 | Li | H03M 13/618 |
| 2020/0177303 A1* | 6/2020 | Ma | H03M 13/1177 |

(Continued)

FOREIGN PATENT DOCUMENTS

| | | | |
|---|---|---|---|
| CN | 106160987 | * | 4/2015 |
| CN | 105281868 A | | 1/2016 |

(Continued)

OTHER PUBLICATIONS

International Search Report issued in PCT/CN2018/098946, dated Apr. 30, 2019 (5 pages).

(Continued)

*Primary Examiner* — Kent Krueger
(74) *Attorney, Agent, or Firm* — Osha Bergman Watanabe & Burton LLP

(57) ABSTRACT

Embodiments of the present invention provide information transmitting and receiving methods, a user equipment, and a base station. The information transmitting method performed by the user equipment includes: receiving indication information, the indication information indicating sub-block sizes of a plurality of sub-blocks obtained by splitting an information block to be transmitted; splitting the information block to be transmitted into the plurality of sub-blocks according to the indication information; processing respective sub-blocks to generate transmission data, and transmitting the transmission data.

16 Claims, 8 Drawing Sheets

(56) References Cited

U.S. PATENT DOCUMENTS

| | | | |
|---|---|---|---|
| 2021/0006373 A1* | 1/2021 | Li | H04L 1/0003 |
| 2021/0013901 A1* | 1/2021 | Li | H03M 13/6516 |
| 2021/0105086 A1* | 4/2021 | Lou | H04L 1/0005 |
| 2021/0288748 A1* | 9/2021 | Li | H04L 1/0009 |
| 2022/0149985 A1* | 5/2022 | Myung | H03M 13/00 |

FOREIGN PATENT DOCUMENTS

| | | |
|---|---|---|
| CN | 105991225 A | 10/2016 |
| CN | 106160937 A | 11/2016 |
| CN | 106160987 A | 11/2016 |

OTHER PUBLICATIONS

Written Opinion of the International Searching Authority issued in PCT/CN2018/098946, dated Apr. 30, 2019 (6 pages).

* cited by examiner

| MCS Index | TBS Index |
|---|---|
| 0 | 0 |
| 1 | 1 |
| 2 | 2 |
| 3 | 3 |
| 4 | 4 |
| ... | ... |
FIG. 3 (a)
| TBS Index | Size partition ratios of sub-blocks |
|---|---|
| 0 | 0.1  0.9 |
| 1 | 0.2  0.8 |
| 2 | 0.3  0.7 |
| 3 | 0.4  0.6 |
| 4 | 0.5  0.5 |
| ... | ... |
FIG. 3 (b)
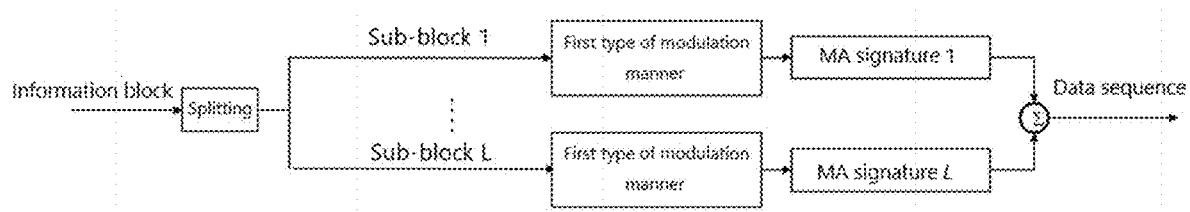
FIG. 4
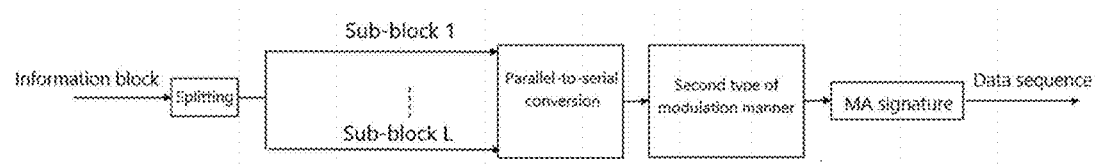
FIG. 5

| Index | Power ratio | Rotation angle |
|---|---|---|
| 0 | 2:1 | Pi/2 |
| 1 | 2:1 | Pi/4 |
| 2 | 3:1 | Pi/2 |
| 3 | 4:1 | Pi/2 |

FIG. 9

| | | | | | | | |
|---|---|---|---|---|---|---|---|
| 0 | 2 | 120 | 0.2344 | 16 | C_o(B,B,0.2,0.8,pi/2) | 120 | 0.2344 |
| 1 | 2 | 193 | 0.3770 | 17 | C_o(B,B,0.2,0.8,pi/2) | 193 | 0.3770 |
| 2 | 2 | 308 | 0.6016 | 18 | C_o(B,B,0.2,0.8,pi/2) | 308 | 0.6016 |
| 3 | 2 | 449 | 0.8770 | 19 | C_o(B,B,0.2,0.8,pi/2) | 449 | 0.8770 |
| 4 | 2 | 602 | 1.1758 | 20 | C_o(B,B,0.2,0.8,pi/2) | 602 | 1.1758 |
| 5 | 4 | 378 | 1.4766 | 21 | C_b(16Q, 1,3) | 378 | 1.4766 |
| 6 | 4 | 434 | 1.6953 | 22 | C_b(16Q, 1,3) | 434 | 1.6953 |
| 7 | 4 | 490 | 1.9141 | 23 | C_b(16Q, 1,3) | 490 | 1.9141 |
| 8 | 4 | 553 | 2.1602 | 24 | C_b(16Q, 1,3) | 553 | 2.1602 |
| 9 | 4 | 616 | 2.4063 | 25 | C_b(16Q, 1,3) | 616 | 2.4063 |
| 10 | 4 | 658 | 2.5703 | 26 | C_b(16Q, 1,3) | 658 | 2.5703 |
| 11 | 6 | 466 | 2.7305 | 27 | C_b(64Q, 2,4) | 466 | 2.7305 |
| 12 | 6 | 517 | 3.0293 | 28 | C_b(64Q, 2,4) | 517 | 3.0293 |
| 13 | 6 | 567 | 3.3223 | 29 | C_b(64Q, 2,4) | 567 | 3.3223 |
| 14 | 6 | 616 | 3.6094 | 30 | C_b(64Q, 2,4) | 616 | 3.6094 |
| 15 | 6 | 666 | 3.9023 | 31 | C_b(64Q, 2,4) | 666 | 3.9023 |

FIG. 10

| | | | | | | | |
|---|---|---|---|---|---|---|---|
| 0 | 2 | 120 | 0.2344 | 16 | C_o(B,B,0.2,0.8,pi/2) | 378 | 0.7402 |
| 1 | 2 | 157 | 0.3066 | 17 | C_o(B,B,0.2,0.8,pi/2) | 449 | 0.8770 |
| 2 | 2 | 193 | 0.3770 | 18 | C_o(B,B,0.2,0.8,pi/2) | 526 | 1.0273 |
| 3 | 2 | 251 | 0.4902 | 19 | C_o(B,B,0.2,0.8,pi/2) | 602 | 1.1758 |
| 4 | 2 | 308 | 0.6016 | 20 | C_o(B,B,0.2,0.8,pi/2) | 679 | 1.3262 |
| 5 | 2 | 379 | 0.7402 | 21 | C_o(Q,B,0.66,0.33,pi/4) | 225 | 0.65918 |
| 6 | 2 | 449 | 0.8770 | 22 | C_o(Q,B,0.66,0.33,pi/4) | 257 | 0.75293 |
| 7 | 2 | 526 | 1.0273 | 23 | C_o(Q,B,0.66,0.33,pi/4) | 289 | 0.84668 |
| 8 | 2 | 602 | 1.1758 | 24 | C_o(Q,B,0.66,0.33,pi/4) | 345 | 1.010742 |
| 9 | 2 | 679 | 1.3262 | 25 | C_b(16Q, 1,3) | 340 | 1.3281 |
| 10 | 4 | 340 | 1.3281 | 26 | C_b(16Q, 1,3) | 378 | 1.4766 |
| 11 | 4 | 378 | 1.4766 | 27 | C_b(16Q, 1,3) | 434 | 1.6953 |
| 12 | 4 | 434 | 1.6953 | 28 | C_b(16Q, 1,3) | 490 | 1.9141 |
| 13 | 4 | 490 | 1.9141 | 29 | C_b(16Q, 1,3) | 553 | 2.1602 |
| 14 | 4 | 553 | 2.1602 | 30 | C_b(16Q, 1,3) | 616 | 2.4063 |
| 15 | 4 | 616 | 2.4063 | 31 | Reserved | | |

SPLITTING AN INFORMATION BLOCK INTO SUB-BLOCKS

TECHNICAL FIELD

The present application relates to a field of wireless communication, and in particular, to information transmitting and receiving methods, a user equipment, and a base station that may be used in a wireless communication system.

BACKGROUND

In a wireless communication system, selection of resources for transmitting the uplink (UL) shared data channel is generally scheduling/authorization-based, and a scheduling and authorization mechanism may be controlled by a base station. In specific application processes, a user equipment transmits a channel quality indicator (CQI) to the base station and requests the base station to perform uplink scheduling. After the base station receives the uplink scheduling request and obtains the CQI, it may allocate resources to the user equipment. The base station selects the most suitable modulation and coding scheme (MCS) in an MCS table based on a known accurate signal to interference plus noise ratio (SINR), and then notifies the user equipment of allocated resources and an index of the MCS. The user equipment then processes data using the MCS and transmits the data using authorized resources. The above-mentioned scheduling/authorization-based uplink access method may form a good match with a wireless network environment, so as to obtain high throughput using a current network environment and improve channel transmission quality.

However, in a radio resource configuration/reconfiguration process without grant, the uplink resources corresponding to the MCS index used by the user equipment may not be based on the accurate SINR. In addition, for example, in 5G New Radio (NR) scenarios, in order to reduce delay and increase the number of connected devices, a grant-free access scheme may exist. In grant-free access process, the uplink resources corresponding to the MCS index can neither be determined based on the accurate SINR. The above situation will lead to failure in forming a good match with the current wireless network environment during uplink transmission, thereby failing to obtain better channel transmission quality.

SUMMARY OF THE INVENTION

According to one aspect of the present invention, there is provided an information transmitting method performed by a user equipment comprising: receiving indication information, the indication information indicating sub-block sizes of a plurality of sub-blocks obtained by splitting an information block to be transmitted; splitting the information block to be transmitted into the plurality of sub-blocks according to the indication information; processing respective sub-blocks to generate transmission data, and transmitting the transmission data.

According to another aspect of the present invention, there is provided a user equipment comprising: a receiving unit configured to receive indication information, the indication information indicating sub-block sizes of a plurality of sub-blocks obtained by splitting an information block to be transmitted; an splitting unit configured to split the information block to be transmitted into the plurality of sub-blocks according to the indication information; a transmitting unit is configured to process respective sub-blocks to generate transmission data, and transmitting the transmission data.

According to another aspect of the present invention, there is provided an information receiving method performed by a base station comprising: transmitting indication information, the indication information indicating sub-block sizes of a plurality of sub-blocks obtained by splitting an information block to be transmitted by a user equipment; receiving transmission data of the user equipment, the transmission data being generated by the user equipment splitting the information block to be transmitted into the plurality of sub-blocks according to the indication information and processing respective sub-blocks.

According to another aspect of the present invention, there is provided a base station comprising: a transmitting unit configured to transmit indication information, the indication information indicating sub-block sizes of a plurality of sub-blocks obtained by splitting an information block to be transmitted by a user equipment; a receiving unit configured to receive transmission data of the user equipment, the transmission data being generated by the user equipment splitting the information block to be transmitted into the plurality of sub-blocks according to the indication information and processing respective sub-blocks.

With the above aspect of the present invention, the information block to be transmitted of the user equipment may be split into the plurality of sub-blocks by using the indication information transmitted by the base station, and each sub-block is processed accordingly, so that it can be adapted to different wireless network channel conditions to transmit information and improve channel transmission quality.

BRIEF DESCRIPTION OF THE DRAWINGS

The above and other objects, features and advantages of the present invention will become more apparent by describing embodiments of the present invention in more details with reference to accompanying drawings.

FIG. 3(a) shows a schematic diagram of correspondence relationship between TBS index and MCS index according to one embodiment of the present invention; FIG. 3(b) shows one example of a TBS partition table according to one embodiment of the present invention;

FIG. 4 shows a schematic diagram of modulating the respective sub-blocks by using a first type of modulation manner respectively according to one embodiment of the present invention;

FIG. 5 shows a schematic diagram of modulating of converted single data sequence by using a second type modulation manner according to one embodiment of the present invention;

FIG. 9 shows a constellation mapping information table according to one embodiment of the present invention;

FIG. 10 shows an example of a second modulation and coding scheme table according to one embodiment of the present invention;

FIG. 11 shows an example of a second modulation and coding scheme table according to one embodiment of the present invention;

FIG. 12 shows an example of a second modulation and coding scheme table according to one embodiment of the present invention;

FIG. 13 shows an example of a third modulation and coding scheme table according to one embodiment of the present invention;

FIG. 14 shows an example of a third modulation and coding scheme table according to one embodiment of the present invention;

FIG. 15 shows an example of a fourth modulation and coding scheme table according to one embodiment of the present invention;

FIG. 16 shows an example of a fourth modulation and coding scheme table according to one embodiment of the present invention;

DESCRIPTION OF THE EMBODIMENTS

Figure 1:
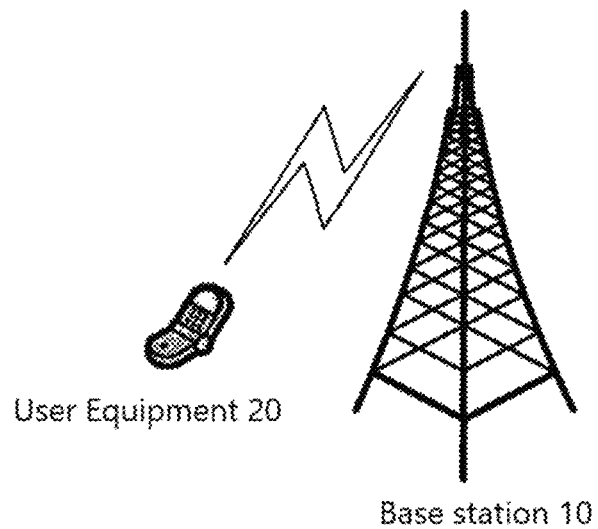
FIG. 1 shows a schematic diagram of a wireless communication system according to an embodiment of the present invention.

Information transmitting and receiving methods, a user equipment, and a base station according to embodiments of the present invention will be described below with reference to accompanying drawings. Throughout the accompanying drawings, the same reference numerals represent the same elements. It is to be understood that the embodiments described herein are merely illustrative and shall not be construed to limit the scope of the present invention.

First, a wireless communication system according to the embodiments of the present invention will be described with reference to FIG. 1. As shown in FIG. 1, the wireless communication system may include a base station 10 and a user equipment (UE) 20. The UE 20 may receive information transmitted by the base station 10 through a physical downlink control channel (PDCCH) and a physical downlink shared channel (PDSCH). It should be appreciated that although one base station and one UE are shown in FIG. 1, this is only illustrative, and the wireless communication system may include one or more base stations and one or more UEs. In addition, the base station 10 may be a transmitting and receiving point (TRP), or may schedule a plurality of TRPs by using a same central processing unit. In the following, the terms "base station" and "TRP" are used interchangeably.

Figure 2:
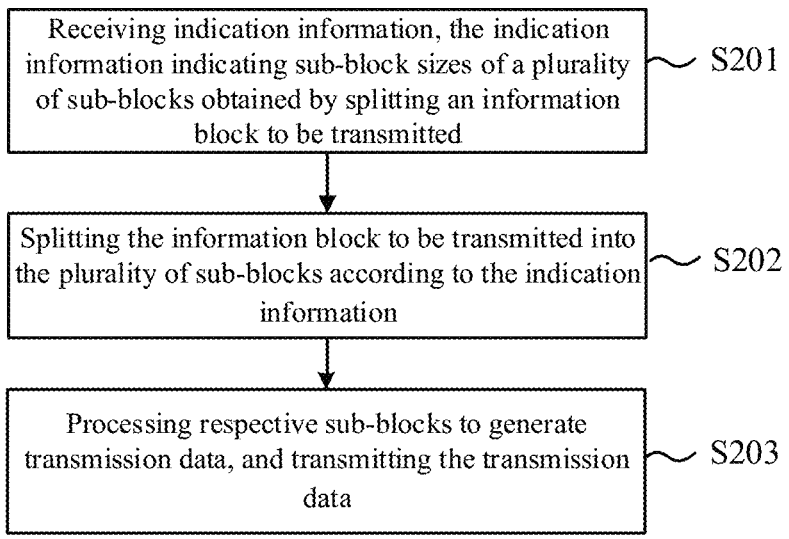
FIG. 2 shows a flowchart of an information transmitting method according to one embodiment of the present invention.

FIG. 2 shows a flowchart of an information transmitting method 200 according to one embodiment of the present invention. The method may be performed by the user equipment.

As shown in FIG. 2, in step S201, indication information is received, the indication information indicating sub-block sizes of a plurality of sub-blocks obtained by splitting an information block to be transmitted.

In the embodiments of the present invention, the information block to be transmitted may be a transmission block, and accordingly, the sub-block sizes of the information block may also be sub-block sizes of the transmission block.

In a first implementation manner of the embodiments of the present invention, the indication information may include sizes and/or size partition ratios corresponding to respective sub-blocks.

In practical applications, the indication information may directly indicate the respective split sub-block sizes, or directly indicate the size partition ratios of respective split sub-blocks. Alternatively, the indication information may indirectly indicate the size partition ratios of respective sub-blocks by indicating specific content corresponding to a certain/some size partition ratios in a table containing the size partition ratios. The table may be stored in advance on both ends of the user equipment and the base station, and may be signaled to the user equipment by the base station, or may be reported in advance by the user equipment to the base station, which is not limited herein.

In a second implementation manner of the embodiments of the present invention, the indication information may include modulation and coding scheme index (MCS index) and/or parameters (for example, modulation order, target bit rate and/or spectral efficiency, etc., or constellation mapping information mentioned later) corresponding to the MCS index in a modulation and coding scheme table. For example, a correspondence table between the MCS index and the sub-block sizes and/or size partition ratios of respective sub-blocks may be set, so that the sub-block sizes and/or size partition ratios may be determined through the index indicated by the indication information. Alternatively, a transmission block size (TBS) partition table may be set, and the TBS partition table may include indexes of sub-block sizes, the sub-block sizes and/or the size partition ratios corresponding to indexes of sub-block sizes, and the MCS index or its corresponding parameters may correspond to the indexes of sub-block sizes in the TBS partition table, so that the corresponding sub-block sizes and/or the size partition ratios may be determined according to the MCS index or its corresponding parameters.

In the above implementation manner of determining the respective sub-block sizes through the MCS index and/or corresponding parameters, the MCS and/or corresponding parameters may be included in the corresponding MCS table.

In one example, the corresponding modulation and coding scheme table may be a second modulation and coding scheme table obtained by changing parameters corresponding to one or more modulation and coding scheme indexes in a first modulation and coding scheme table. The first modulation and coding scheme table may be one or more of existing MCS tables, for example, one or more of respective MCS tables in Rel-15NR.

In another example, the corresponding modulation and coding scheme table may be a third modulation and coding scheme table obtained by adding one or more modulation and coding scheme indexes and parameters corresponding to the one or more modulation and coding scheme indexes to the first modulation and coding scheme table.

In another example, the corresponding modulation and coding scheme table may be at least one fourth modulation and coding scheme table separated from the first modulation and coding scheme table and obtained by constructing based on the modulation and coding scheme indexes and parameters corresponding to the modulation and coding scheme indexes. The first modulation and coding scheme table and the at least one fourth modulation and coding scheme tables correspond to different channel conditions and/or channel quality feedback conditions, respectively. In this case, tables in the first modulation and coding scheme table and the at least one fourth modulation and coding scheme table may be selected according to the channel conditions and/or channel quality feedback conditions. For example, a plurality of the first tables may be set, corresponding respectively to situations such as higher spectral efficiency and lower spectral efficiency, etc., and a plurality of the fourth tables may be set, each corresponding to situations such as higher spectral efficiency and lower spectral efficiency, etc. In this way, for scenarios with channel conditions (lower reliability requirements) and channel quality feedback conditions (shorter CQI reporting periods), a table with higher spectral efficiency in the existing first modulation and coding scheme table may be selected; for scenarios with higher reliability requirements and shorter CQI reporting periods, a table with lower spectral efficiency in the existing first modulation and coding scheme table may be selected; for scenarios with lower reliability requirements and longer CQI reporting periods, a table with higher spectral efficiency in a newly-created fourth modulation and coding scheme table may be selected; for scenarios with higher reliability requirements and longer CQI reporting periods, a table with lower spectral efficiency in the fourth modulation and coding scheme table may be selected. Of course, the content about the channel conditions and the channel quality feedback conditions described above are merely examples. In actual application scenarios, the modulation and coding scheme table may be selected according to any channel conditions and channel quality feedback conditions.

The second modulation and coding scheme table, the third modulation and coding scheme table, and the fourth modulation and coding scheme table described above will be described in detail later. In addition, the first modulation and coding scheme table, the second modulation and coding scheme table, the third modulation and coding scheme table, and the fourth modulation and coding scheme table may exist simultaneously, or only a part of the tables may exist. Optionally, selection information used to select the foregoing tables may be indicated to the user equipment through indication information or RRC signaling, etc., to inform which table is selected for division and/or modulation. Of course, the selection information for the tables may also be determined by the user equipment and fed back to the base station, which is not limited herein. In addition, when the tables are selected by the user equipment but not notified to the base station, the base station may also receive transmission data transmitted by the user equipment through a blind detection method and the like to determine the modulation and coding scheme of the transmission data.

In step S202, the information block to be transmitted is split into the plurality of sub-blocks according to the indication information.

As described above, the indication information may include sizes or size partition ratios corresponding to respective sub-blocks. When the indication information includes sizes corresponding to respective sub-blocks, the information block to be transmitted may be directly split into the plurality of sub-blocks according to the sizes.

When the indication information includes size partition ratios corresponding to respective sub-blocks, the information block to be transmitted may be split into the plurality of sub-blocks in the following manner.

Specifically, in order to ensure the correctness of the data, in the case of transmitting the entire information block to be transmitted, additional bits (such as cyclic redundancy check (CRC) bits or other types of additional bits) need to be additionally transmitted for the information block to be transmitted, and then the information block may be transmitted. On the other hand, in the embodiments of the present invention, the information block to be transmitted is split into the plurality of sub-blocks for transmission, so it is necessary to additionally transmit additional bits to each sub-blocks for transmission. Considering the transmitting additional bits, various division methods may be adopted, for example, the following two example methods are used to split the information block to be transmitted.

Specifically, the information block size of the information block to be transmitted may be expressed as $N_{info}$, which indicates, for example, the number of bits included in the information block to be transmitted, where:

$$N_{info} = v \cdot \bar{N}'_{RE} \cdot n_{PRB} \cdot R \cdot Q_m$$

v is the number of data streams to be transmitted by the user equipment, $\bar{N}'_{RE}$ is the quantized number of resource elements (RE) of each physical resource block (PRB), $n_{PRB}$ is the number of PRBs, R is the target bit rate×[1024], and $Q_m$ is the modulation order. On this basis, when the information block to be transmitted of size $N_{info}$ is split into L (L≥1) sub-blocks, the sub-block sizes of respective sub-blocks may be expressed as $N_1, N_2, \ldots, N_L$, respectively.

In one implementation manner, the information block size of the information block to be transmitted may be equal to a sum of sub-block sizes of the respective sub-blocks, that is, $\sum_{l=1}^{L} N_l = N_{info}$. This example may transmit all the bits in the information block to be transmitted through the plurality of split sub-blocks, thereby ensuring the integrity of the content of the final transmitted data. Specifically, after knowing the information block size $N_{info}$ of the information block to be transmitted and the size partition ratio $W_l$ corresponding to respective sub-blocks, a sub-block calculation size of the $l^{th}$ sub-block may be expressed as $N'_l = N_{info} W_l$, 1≤l≤L. Considering that the existing TBS table (for example, the TBS table in the Rel-15 NR) contains each known TBS (for example, the number of bits), it may first be judged whether the sub-block calculation size $N'_l$ of the $l^{th}$ sub-block exists in the TBS table, that is, whether it is the same as a certain TBS in the TBS table. If it exists, it is considered that the size of the $l^{th}$ sub-block $N_l$ is equal to the sub-block calculation size $N'_l$ of the $l^{th}$ sub-block, that is, $N_l = N'_l$. If the value of sub-block calculation size $N'_l$ of the $l^{th}$ sub-block is not in the known TBS table, it is necessary to find the closest value to the sub-block calculation size $N'_l$ of the $l^{th}$ sub-block in the known TBS table, denoted as $\tilde{N}'_l$. Repeat the above process for each sub-block, and then express the closest value of L sub-blocks as a closest vector $\tilde{T} = [\tilde{N}'_1, \ldots, \tilde{N}'_L]$. In addition, m vectors $T_1 = [N''_1, \ldots, N''_L]$ that satisfy $\sum_{l=1}^{L} N''_l = N_{info}$ may be obtained. For example, values of $N_1, N_2, \ldots, N_L$ may be arbitrarily taken, so that $\sum_{l=1}^{L} N''_l = N_{info}$. And $N_1, N_2, \ldots, N_L$ are expressed as $T_1 = [N''_1, \ldots, N''_L]$. Repeat this process until m vectors $T_i = [N''_1, \ldots, N''_L]$ (i=1~m) that satisfy $\sum_{l=1}^{L} N''_l = N_{info}$ are obtained, where m is a positive integer. After obtaining the m vectors $T_i$, the $j^{th}$ vector $T_j$ that satisfies $\min_i \|T_i - \tilde{T}\|$ may be obtained from the m vectors $T_i$, and the values of respective elements in this vector $T_j$ are recorded as the respective sub-block sizes for L sub-blocks in the information block to be transmitted. In this way, on the premise that the information block size of the information block to be transmitted is equal to the sum of the sub-block sizes of the respective sub-block, it is possible to ensure that the size partition ratios corresponding to respective sub-blocks are closest to the requirements of the actual application scenarios.

In another implementation manner, a sum of the information block size of the information block to be transmitted and a transmission additional bit length of the information block to be transmitted is equal to a sum of sub-block sizes of the respective sub-blocks and transmission additional bit lengths of the respective sub-blocks. This example may ensure that the number of bits of the transmitted data transmitted after the division is the same as that of the information block to be transmitted, thereby ensuring the same spectral efficiency. In this implementation manner, the sum of the information block size of the information block to be transmitted and the transmission additional bit length of the information block to be transmitted is equal to the sum of sub-block sizes of the respective sub-blocks and the transmission additional bit lengths of the respective sub-blocks. Specifically, the information block size to be transmitted and each sub-block may be expressed as: $\Sigma_{l=1}^{L}(N_l+CRC_l)=N_{info}+CRC_{info}$, where $CRC_l$ is the length of the transmission additional bits of the $l^{th}$ sub-block (here, the CRC bits are taken examples), and $CRC_{info}$ is the length of the transmission additional bits of the information block to be transmitted. The sub-block sizes of the respective sub-blocks may be determined in the following manner. Specifically, after knowing the information block size $N_{info}$ of the information block to be transmitted and the size partition ratio $W_l$ corresponding to respective sub-blocks, the sub-block calculation size of the $l^{th}$ sub-block may be expressed as $N'_l=(N_{info}+CRC_{info}-\Sigma_{l=1}^{L}CRC_l) W_l$, $1 \leq l \leq L$. Considering that the existing TBS table (for example, the TBS table in the Rel-15NR) contains each known TBS (the number of bits), it may first be judged whether the sub-block calculation size $N'_l$ of the $l^{th}$ sub-block exists in the TBS table, that is, whether it is the same as a certain TBS in the TBS table. If it exists, it is considered that the size of the $l^{th}$ sub-block $N_l$ is equal to the sub-block calculation size $N'_l$ of the $l^{th}$ sub-block, that is, $N_l=N'_l$. If the value of sub-block calculation size $N'_l$ of the $l^{th}$ sub-block is not in the known TBS table, it is necessary to find the closest value to the sub-block calculation size $N'_l$ of the $l^{th}$ sub-block in the known TBS table, denoted as $\tilde{N}'_l$. Repeat the above process for each sub-block, and then express the closest value of L sub-blocks as a closest vector $\tilde{T}=[\tilde{N}'_1, \ldots, \tilde{N}'_L]$. In addition, m vectors $T_1=[N''_1, \ldots, N''_L]$ that satisfy $\Sigma_{l=1}^{L}N''_l=N_{info}+CRC_{info}-\Sigma_{l=1}^{L}CRC_l$ may be obtained. For example, values of $N_1$, $N_2$, …, $N_L$ may be arbitrarily taken, so that $\Sigma_{l=1}^{L}N''_l=N_{info}+CRC_{info}-\Sigma_{l=1}^{L}CRC_l$. And $N_1, N_2, \ldots, N_L$ are expressed as $T_1=[N''_1, \ldots, N''_L]$. Repeat this process until m vectors $T_i=[N''_1, \ldots, N''_L]$ (i=1~m) that satisfy $\Sigma_{l=1}^{L}N''_l=N_{info}+CRC_{info}-\Sigma_{l=1}^{L}CRC_l$ may be obtained, where m is a positive integer. After obtaining the m vectors $T_i$, the $j^{th}$ vector $T_j$ that satisfies $\min_i\|T_i-\tilde{T}\|$ may be obtained from the m vectors $T_i$, and the values of respective elements in this vector $T_j$ are recorded as the respective sub-block sizes for L sub-blocks in the information block to be transmitted. In this way, on the premise that the sum of the information block size of the information block to be transmitted and the transmission additional bit length of the information block to be transmitted is equal to the sum of sub-block sizes of the respective sub-blocks and the transmission additional bit lengths of the respective sub-blocks, it is possible to ensure that the size partition ratios corresponding to respective sub-blocks are closest to the requirements of the actual application scenarios.

Alternatively, the indication information includes the modulation and coding scheme index (MCS index) and/or the parameters (for example, modulation order, target bit rate and/or spectral efficiency, etc., or constellation mapping information mentioned later) corresponding to the MCS index in a modulation and coding scheme table. In this case, as an example, the MCS index and/or the corresponding parameters may correspond to the indexes of the sub-block sizes in the TBS partition table, so that the splitting the information block to be transmitted into the plurality of sub-blocks according to the indication information may include: obtaining indexes of sub-block sizes corresponding to the modulation and coding scheme index and/or parameters corresponding to the modulation and coding scheme index according to the modulation and coding scheme index and/or parameters corresponding to the modulation and coding scheme index, and determining sub-block sizes of the respective sub-blocks according to the indexes of sub-block sizes. The modulation and coding scheme table corresponding to the MCS index and/or the corresponding parameters may include the aforementioned first modulation and coding scheme table, the second modulation and coding scheme table, the third modulation and coding scheme table, and/or the fourth modulation and coding scheme table.

FIG. 3(a) shows a schematic diagram of correspondence relationship between TBS index and MCS index according to the above implementation manner of the present invention; FIG. 3(b) shows one example of a TBS partition table according to the above implementation manner of the present invention. As shown in FIG. 3(a), after the MCS index is directly obtained according to the indication information, or the corresponding MCS index is obtained according to the parameters corresponding to the MCS index, the TBS index corresponding to the MCS index may be determined according to the correspondence relationship between the TBS index and the MCS index. Subsequently, the size partition ratios of respective sub-blocks corresponding to the TBS index may be determined according to the TBS partition table in FIG. 3(b). Then, according to the manner described above, the information block to be transmitted is split into the plurality of sub-blocks according to the size partition ratios of respective sub-blocks. Of course, FIG. 3(a) and FIG. 3(b) are only examples. In actual applications, the corresponding relationship in FIG. 3(a) and FIG. 3(b) may be expressed in any way. For example, it is also possible to use only one table to represent the contents of FIG. 3(a) and FIG. 3(b). In addition, the TBS partition table in FIG. 3(b) may not show the size partition ratios of the sub-blocks, but may be replaced with other parameters, such as the specific number of bits of respective sub-block sizes. The mapping relationship in FIG. 3(a) and/or FIG. 3(b) may be stored in advance at both ends of the base station and the user equipment, or may be signaled to the user equipment by the base station, or may be reported in advance by the user equipment to the base station, which is not limited herein.

In step S203, respective sub-blocks are processed to generate transmission data, and the transmission data is transmitted.

In one implementation manner, the respective sub-blocks may be modulated by using a first type of modulation manner, respectively. The first type of modulation manner may be a relatively low-order modulation manner. The low-order modulation here and the subsequent high-order modulation are relative concepts, and are not strict limitations on the modulation manner. In this example, a relatively low-order constellation may be used for mapping for respective sub-blocks, respectively, and the mapping manner for respective sub-blocks may be the same or different. Subsequently, respective modulated sub-blocks may also be processed with signature (such as multiple access signature (MA signature)), respectively, and other processing (if any) may be performed on the processed transmission data, and then the processed transmission data may be combined into a single data sequence and transmitted out. The signature may include information indicating at least one of a power, a spreading sequence, a scrambling sequence, and an interleaving pattern and the like set for the corresponding sub-blocks, or may be other information specific to the corresponding sub-blocks, which is not limited herein. FIG. 4 shows a schematic diagram of modulating the respective sub-blocks by using a first type of modulation manner respectively according to this example of the present invention. As shown in FIG. 4, after the information block to be transmitted is split into sub-blocks 1 to L, respective sub-blocks may be modulated by using the first type of modulation manner, respectively, and respective modulated sub-blocks is processed by using the multiple access signature (MA signature), respectively. Then the processed sub-blocks are combined into a single data sequence, which is transmitted out as the transmission data. In one example, after the information block to be transmitted is split into the plurality of sub-blocks, and before the respective sub-blocks are modulated by using the first type of modulation manner respectively, channel coding is performed on respective sub-blocks. Optionally, respective sub-blocks may be encoded by using a forward error correction code (FEC). For example, respective sub-blocks may be encoded by additionally transmitting additional bits (such as cyclic redundancy check (CRC) bits or other types of additional bits). And then the encoded sub-blocks are respectively modulated by using the first type of modulation manner, respectively. In another example, before the information block to be transmitted is split into the plurality of sub-blocks, channel coding such as the forward error correction code (FEC) may be performed on the information block to be transmitted. Optionally, the information block to be transmitted may be encoded by additionally transmitting additional bits (such as cyclic redundancy check (CRC) bits or other types of additional bits), and then the encoded information block to be transmitted may be split into sub-blocks and the sub-blocks are modulated by using the first type of modulation manner, respectively.

In another implementation manner, the respective sub-blocks may also be converted into a single data sequence, and the single data sequence may be modulated by using a second type of modulation manner. Specifically, the bits in respective sub-blocks may be converted into the single data sequence by parallel-to-serial conversion, and the bits in the single data sequence may be derived from the corresponding sub-block according to the size partition ratios of respective sub-blocks. For example, when the first sub-block size is twice of the second sub-block size, the bits of the first sub-block and the second sub-block may be extracted respectively in the manner of 2:1, for example, to form the respective bits of the single data sequence. That is, two bits of the first sub-block may be extracted, and then one bit of the second sub-block may be extracted to form three bits of the single data sequence. Then, in a similar way, continue to extract the subsequent two bits of the first sub-block and the subsequent one bit of the second sub-block to form the subsequent three bits of the single data sequence, and so on. After converting respective sub-blocks into the single data sequence, the single data sequence may be modulated by using the second type of modulation manner. The second type of modulation manner may be a relatively high-order modulation manner. The high-order modulation here is also a relative concept, and is not a strict limitation on the modulation manner. In this example, a relatively high-order constellation may be used for mapping for the single data sequence, and then, after the modulation, the single data sequence may be processed with the signature (such as multiple access signature (MA signature)) and then the processed transmission data may be transmitted out. For example, the MA signature may include information indicating at least one of the powers, the spreading sequence, the scrambling code sequence, and the interleaving pattern and the like. Of course, the MA signature may not include the foregoing information, which is no limited herein. FIG. 5 shows a schematic diagram of modulating of converted single data sequence by using the second type modulation manner according to this example of the present invention. As shown in FIG. 5, after the information block to be transmitted is split into sub-blocks 1 to L, respective sub-blocks may be converted into the single data sequence by parallel-to-serial conversion, and the data sequence may be modulated by using the second type of modulation manner. Subsequently, the modulated result may also be processed by using the multiple access signature (MA signature) and transmitted out as the transmission data. In one example, after the information block to be transmitted is split into the plurality of sub-blocks, and before respective sub-blocks are converted into the single data sequence and the single data sequence is modulated by using the second type modulation manner, channel coding is performed on each respective sub-block. Optionally, respective sub-blocks may be encoded by using the forward error correction code (FEC). For example, respective sub-blocks may be encoded by additionally transmitting additional bits (such as cyclic redundancy check (CRC) bits or other types of additional bits). And then the encoded sub-blocks are converted into the single data sequence and modulated by using the second type of modulation manner. In another example, before the information block to be transmitted is split into the plurality of sub-blocks, channel coding such as the forward error correction code (FEC) may be performed on the information block to be transmitted. Optionally, the information block to be transmitted may be encoded by additionally transmitting additional bits (such as cyclic redundancy check (CRC) bits or other types of additional bits), and then the encoded information block to be transmitted may be split into sub-blocks and converted into the data sequence, to perform modulating by using the second type of modulation manner.

Optionally, the performing modulation on the single data sequence by using a second type of modulation manner may include: mapping the single data sequence by using the constellation mapping information. As described above, the constellation mapping information may be included in the parameters corresponding to the modulation and coding scheme index.

In one example, the relatively higher-order constellation used in the second type of modulation manner may be one of the existing constellations such as 8QAM, 16QAM, 64QAM, 128QAM, and the like. At this time, the constellation mapping information may include information of an initial constellation, so that the initial constellation is used for mapping. At this time, the single data sequence may be split into a plurality of sub-channels, and different sub-channels of the single data sequence may be mapped using the initial constellation. In this case, the constellation mapping information may further include the number of bits in the single data sequence that respectively correspond to different sub-channels, or the sequence numbers of different sub-channels corresponding to each bit in the single data sequence, respectively. For example, when a 16QAM constellation is used to map one group of data sequence containing 4-bits, two sub-channels may be defined, where one sub-channel has 1 bit, and the other sub-channel has 3 bits. Then, the constellation mapping information may be expressed as: (16Q, 1, 3), which respectively represent a 16QAM constellation, one bit in one bit group which is the first sub-channel, and three bits which are the second sub-channel. Alternatively, the constellation mapping information may be expressed as (16Q, 1, 2, 2, 2), which respectively represents a 16QAM constellation, the first bit in one bit group which is the first sub-channel, and the second to fourth bits which are the second sub-channel. At this time, since the second sub-channel has more bits than the first sub-channel, the second sub-channel has a larger capacity than the first sub-channel, and thus has higher reliability when transmitting the same amount of information. Therefore, data with higher priority may be mapped to the second sub-channel, and data with lower priority may be mapped to the first sub-channel. Each sub-channel may transmit independent coded codewords.

Figure 6:
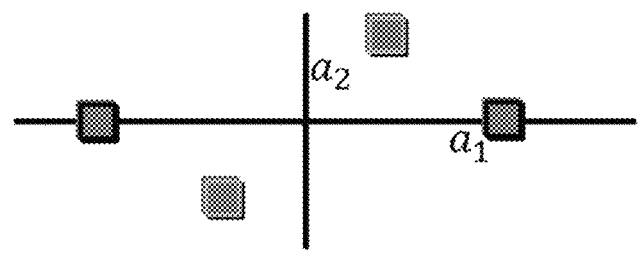
FIG. 6 shows a synthetic constellation according to one embodiment of the present invention.
Figure 7:
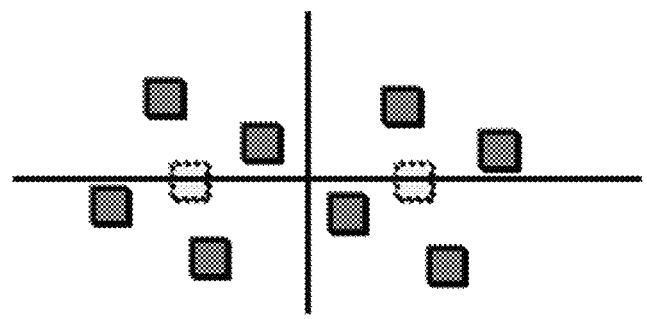
FIG. 7 shows a synthetic constellation according to one embodiment of the present invention.
Figure 8:
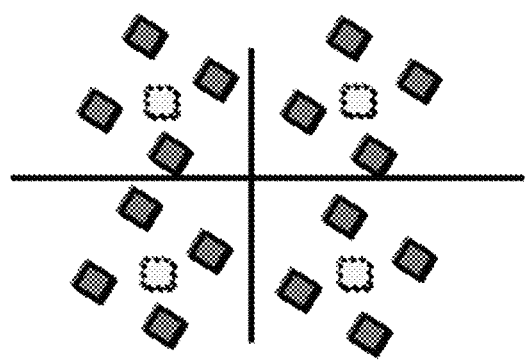
FIG. 8 shows a synthetic constellation according to one embodiment of the present invention.

Alternatively, the relatively higher-order constellation used in the second type of modulation manner may be a synthetic constellation generated according to the constellation mapping information. In one example, the constellation mapping information may include information of one or more initial constellations and/or adjustment factors corresponding to the initial constellations, wherein the adjustment factors may include power ratios and/or rotation angles corresponding to the initial constellations. Therefore, the modulating the single data sequence by using the second type of modulation manner may include: generating a synthetic constellation by using the information of the initial constellation, the power ratios and/or the rotation angles corresponding to the initial constellations, and mapping the single data sequence by using the synthetic constellations. In the above example, the information of the initial constellations may be information representing one or more of constellations such as BPSK, QPSK, 16QAM, 64QAM, 128QAM, etc. In addition, the information of the initial constellations may also represent information of bits of a constellation indicated by the initial constellations. For example, $b_1$, $b_2$, $b_3$, $b_4$, etc. may be used to represent each bit. Further, $B(b_1)$, $Q(b_1, b_2)$ or $16Q(b_1, b_2, b_3, b_4)$ may be used as information of the initial constellations, where $B(b_1)$ represents BPSK for $b_1$, $Q(b_1, b_2)$ may represent QPSK for $b_1$, $b_2$, and $16Q(b_1, b_2, b_3, b_4)$ may represent 16QAM for $b_1$, $b_2$, $b_3$, $b_4$, and so on. Of course, the bit representation may also be omitted, and only B is used for BPSK, Q for QPSK, and 16Q/M for 16QAM. Taking the case where there are two initial constellations as an example, the power ratios corresponding to the two initial constellations may be $a_1$ and $a_2$, respectively, where $a_1$, $a_2 \in \mathbb{R}^+$, $|a_1|^2+|a_2|^2=1$, and the rotation angle $\Phi \in [0, 2\pi]$. The above power ratios and/or the rotation angle may be indicated by the base station according to the current channel feedback status and signaled to the user equipment, or may be determined by the user equipment itself, which is not limited herein. Optionally, when the single data sequence includes a plurality of bits in group of 2 bits, assuming that the information of the initial constellations is (B, B, $a_1$, $a_2$, $\varphi$), then the synthesized constellation may be expressed as $x=a_1 B(b_1)+a_2 e^{-i\varphi} B(b_2)$. When the single data sequence contains groups of 4 bits, assuming that the information of the initial constellations is (Q, Q, $a_1$, $a_2$, $\varphi$), then the synthetic constellation may be expressed as $x=a_1 Q$ ($b_1$, $b_2$)+$a_2 e^{-i\varphi} Q(b_3$, $b_4)$. When the single data sequence contains groups of 6 bits, assuming that the information of the initial constellations is (Q, M, $a_1$, $a_2$, $\varphi$), then the synthetic constellation may be expressed as $x=a_1 Q(b_1, b_2)+a_2 e^{-i\varphi} M(b_3, b_4, b_5, b_6)$. When the single data sequence contains groups of 8 bits, it may be assumed that the information of the initial constellations is (M, M, $a_1$, $a_2$, $\varphi$), then the synthetic constellation may be expressed as $x=a_1 M(b_1, b_2, b_3, b_4)+a_2 e^{-i\varphi} M(b_5, b_6, b_7, b_8)$. FIGS. 6 to 8 show three examples of the synthetic constellation according to the embodiment of the present invention, where the synthetic constellation in FIG. 6 is composed of two BPSK constellations, and the BPSK constellation with a power ratio of $a_2$ is rotated by $\varphi=45°$. The synthetic constellation in FIG. 7 is composed of BPSK and QPSK constellations, and the QPSK constellation is rotated by $\varphi=45°$. The synthetic constellation in FIG. 8 is composed of two QPSK constellations, and the QPSK constellation with a power ratio of $a_2$ is rotated by $\varphi=45°$. As in the synthetic constellation shown in FIGS. 6-8, the distance between each constellation point may be adjusted by adjusting values of the power factors $a_1$ and $a_2$, so as to obtain different reliabilities corresponding to different sub-channels, to achieve rate division and thereby avoiding degradation of channel transmission performance and capacity due to channel conditions or channel feedback.

In one example, the constellation mapping information may be from the parameters corresponding to the aforementioned modulation and coding scheme index. Specifically, the indication information may indicate the constellation mapping information included in the corresponding modulation and coding scheme table by indicating a modulation and coding scheme index and/or parameters corresponding to the modulation and coding scheme index in the modulation and coding scheme table.

In another example, the constellation mapping information may be constructed into one or more constellation mapping information tables, and the constellation mapping information table may include information such as the initial constellation information, the power ratios and/or rotation angles corresponding to the initial constellation. Therefore, the indication information may be indication information for indicating the constellation mapping information in the constellation mapping information table. For example, the indication information may indicate the initial constellation information in the constellation mapping information, the power ratios and/or the rotation angles corresponding to the initial constellation, through indexes in the constellation mapping information table. Optionally, the constellation mapping information table may include information on the power ratios and/or rotation angles corresponding to the initial constellation, and the indication information may indicate the power ratios and/or rotation angles corresponding to the initial constellations in the constellation mapping information through indexes in the constellation mapping information table. In this example, the initial constellation information may be separately indicated through signaling such as RRC. FIG. 9 shows a constellation mapping information table according to one embodiment of the present invention. The constellation mapping information table shown in FIG. 9 includes the power ratios and rotation angles corresponding to the initial constellation. Specifically, the power ratios and rotation angles information in the constellation mapping information table may be determined by using the constellation mapping information index transmitted by the indication information. For example, through the index 1 in the constellation mapping information table, the indication information may indicate that the power ratio of $a_1$ and $a_2$ is 2:1, and the rotation angle φ is π/4.

According to the information transmitting method of the embodiments of the present invention, the information block to be transmitted of the user equipment may be split into the plurality of sub-blocks by using the indication information transmitted by the base station, and each sub-block is processed accordingly, so that it can be adapted to different wireless network channel conditions to transmit information and improve channel transmission quality.

The following will list several specific implementation manners of the second modulation and coding scheme table, the third modulation and coding scheme table, and the fourth modulation and coding scheme table in the embodiments of the present invention:

Implementation Manner of the Second Modulation and Coding Scheme Table

Figures 12, 13:
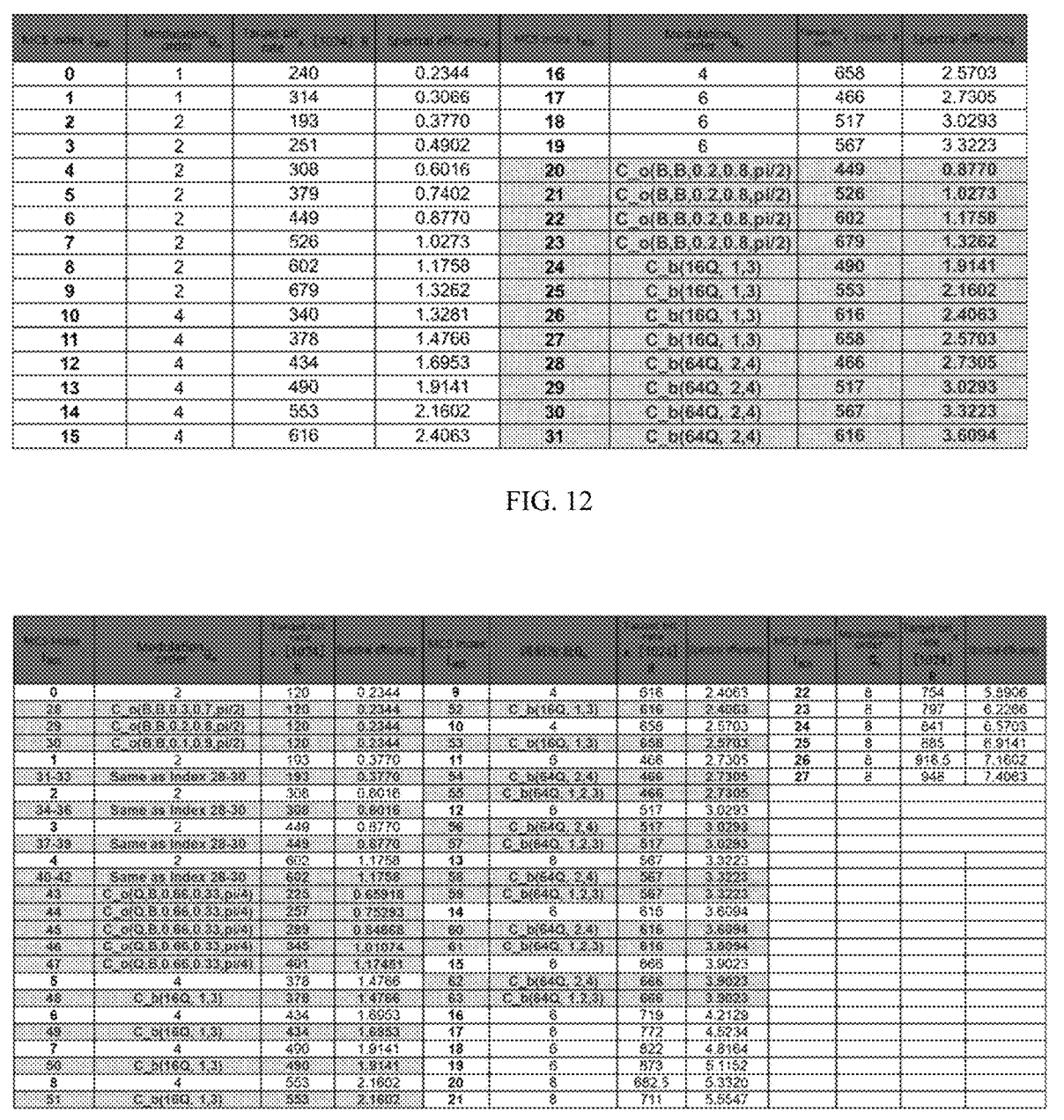

FIG. 10-12 show examples of the second modulation and coding scheme table according to the embodiments of the present invention. That is, the second modulation and coding scheme table shown in FIG. 10-12 is obtained by changing parameters corresponding to a part of MCS indexes in a known MCS table. Specifically, a 5-bit MCS table in FIG. 10 is obtained by changing the corresponding parameters of the MCS indexes 16-31 (as shown by the shaded part) in the known MCS table. Taking MCS index 16 as an example, B in the modulation order $Q_m$ column represents the initial constellation BPSK, 0.2 and 0.8 represent the power ratio of each sub-block in the two sub-blocks are 0.2 and 0.8, and pi/2 represents that the rotation angle is π/2. In this example, when the two initial constellations are both BPSK, the size partition ratio of the two sub-blocks split according to the above parameters is 1:1. In addition, taking MCS index 21 as an example, 16Q in the modulation order $Q_m$ column represents a 16QAM constellation, 1 indicates that the first sub-channel has 1 bit, and 3 indicates that the second sub-channel has 3 bits. Similarly, a 5-bit MCS table in FIG. 11 is obtained by changing the corresponding parameters of the MCS indexes 16-30 (as shown by the shaded part) in the known MCS table. A 5-bit MCS table in FIG. 12 is obtained by changing the corresponding parameters of the MCS indexes 20-31 (as shown by the shaded part) in the known MCS table.

Implementation Manner of the Third Modulation and Coding Scheme Table

Figures 14, 15, 16:
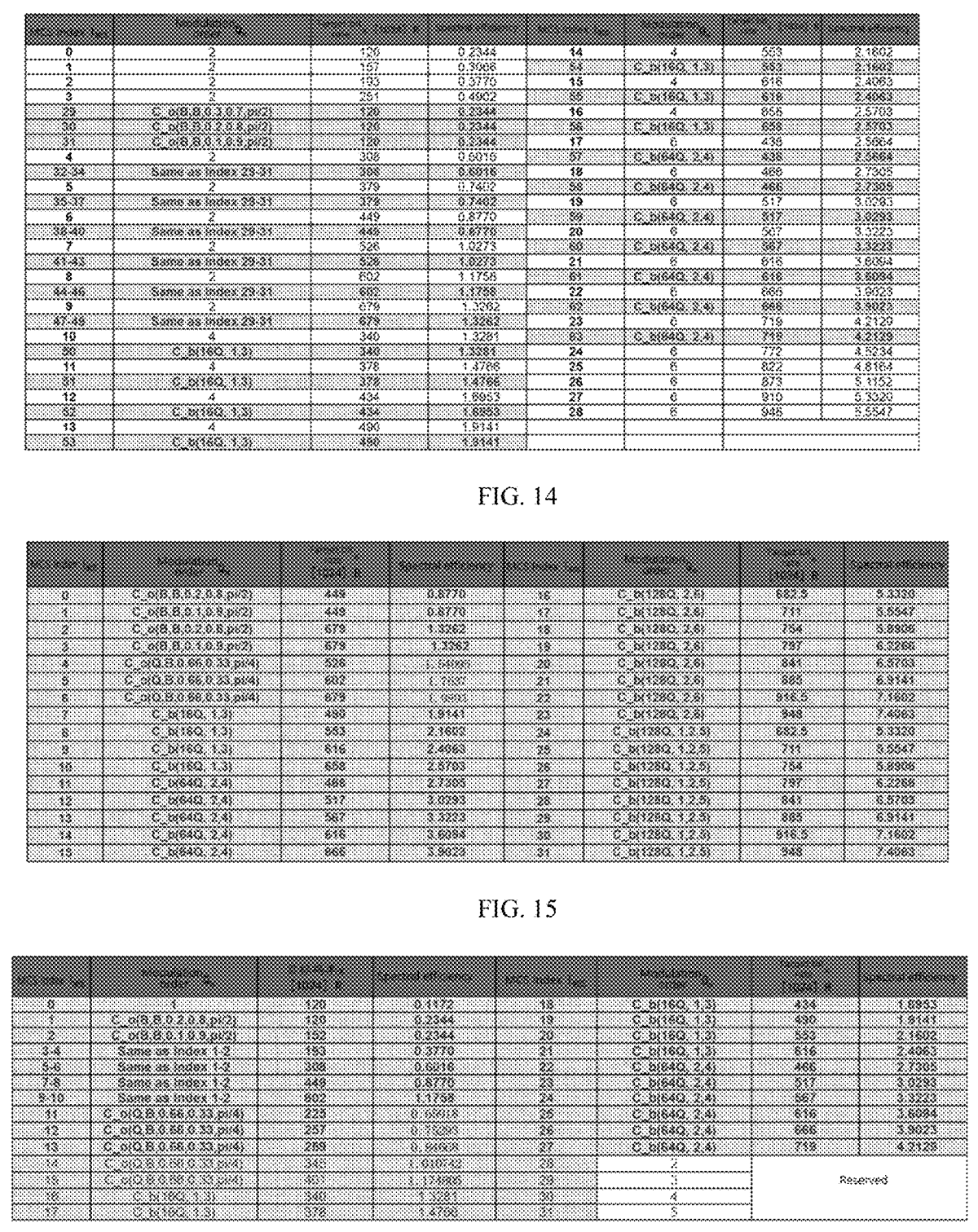

FIG. 13-14 show examples of the third modulation and coding scheme table according to the embodiments of the present invention. The third modulation and coding scheme table shown in FIG. 13-14 is obtained by adding the MCS indexes and their corresponding parameters to the known MCS table. Specifically, a 6-bit MCS table in FIG. 13 is obtained by adding corresponding parameters of the MCS indexes 28-63 (as shown by the shaded part) to the known 5-bit MCS table. A 6-bit MCS table in FIG. 14 is obtained by adding corresponding parameters of the MCS indexes 29-63 (as shown by the shaded part) to the known 5-bit MCS table.

Implementation Manner of the Fourth Modulation and Coding Scheme Table

FIG. 15-16 show examples of a fourth modulation and coding scheme table according to the embodiments of the present invention. The modulation and coding scheme table shown in FIG. 15-16 is the fourth modulation and coding scheme table separately from the first modulation and coding scheme table, which is obtained by constructing based on the modulation and coding scheme indexes and t parameters corresponding to the modulation and coding scheme indexes. Specifically, the 5-bit MCS table in FIG. 15 is a reconstructed MCS table that is different from the known MCS table and has MCS indexes 0-31, which has relatively high reliability and high spectral efficiency. A 5-bit MCS table in FIG. 16 is a reconstructed MCS table that is different from the known MCS table and has MCS indexes 0-27, which has relatively high reliability and low spectral efficiency.

Figure 17:
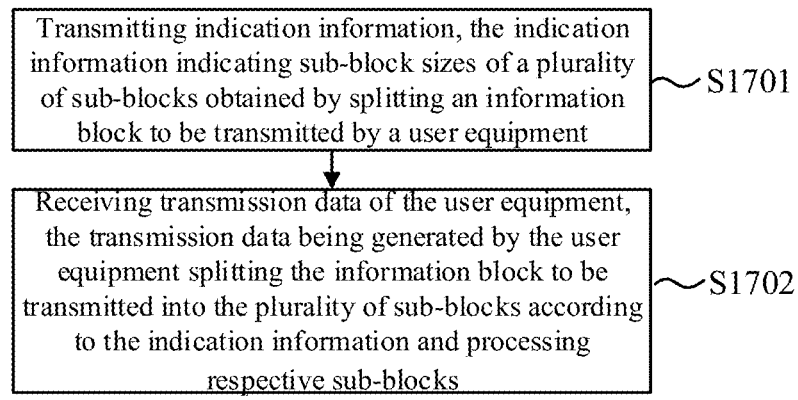
FIG. 17 shows a flowchart of an information receiving method according to one embodiment of the present invention.

FIG. 17 shows a flowchart of an information receiving method 1700 according to one embodiment of the present invention, and the method may be performed by a base station.

As shown in FIG. 17, in step S1701, indication information is transmitted, the indication information indicating sub-block sizes of a plurality of sub-blocks obtained by splitting an information block to be transmitted by a user equipment.

In the embodiments of the present invention, the information block to be transmitted may be a transmission block, and accordingly, the sub-block sizes of the information block may also be sub-block sizes of the transmission block.

In a first implementation manner of the embodiments of the present invention, the indication information may include sizes and/or size partition ratios corresponding to the plurality of sub-blocks obtained by the user equipment by splitting the information block to be transmitted.

In practical applications, the indication information may directly indicate the respective split sub-block sizes, or directly indicate the size partition ratios of respective split sub-blocks. Alternatively, the indication information may indirectly indicate the size partition ratios of respective sub-blocks by indicating specific content corresponding to a certain/some size partition ratios in a table containing the size partition ratios. The table may be stored in advance on both ends of the user equipment and the base station, and may be signaled to the user equipment by the base station, or may be reported in advance by the user equipment to the base station, which is not limited herein.

In another example of the above scenario, a sum of the information block size of the information block to be transmitted and a transmission additional bit length of the information block to be transmitted is equal to a sum of sub-block sizes of the respective sub-blocks and transmission additional bit lengths of the respective sub-blocks. This example may ensure that the number of bits of the transmitted data transmitted after the division is the same as that of the information block to be transmitted, thereby ensuring the same spectral efficiency.

In a second implementation manner of the embodiments of the present invention, the indication information may include modulation and coding scheme index (MCS index) and/or parameters (for example, modulation order, target bit rate and/or spectral efficiency, etc., or constellation mapping information mentioned later) corresponding to the MCS index in a modulation and coding scheme table. For example, a correspondence table between the MCS index and the sub-block sizes and/or size partition ratios of respective sub-blocks may be set, so that the sub-block sizes and/or size partition ratios may be determined through the index indicated by the indication information. Alternatively, a transmission block size (TBS) partition table may be set, and the TBS partition table may include indexes of sub-block sizes, the sub-block sizes and/or the size partition ratios corresponding to indexes of sub-block sizes, and the MCS index or its corresponding parameters may correspond to the indexes of sub-block sizes in the TBS partition table, so that the corresponding sub-block sizes and/or the size partition ratios may be determined according to the MCS index or its corresponding parameters.

In the above implementation manner of determining the respective sub-block sizes through the MCS index and/or corresponding parameters, the MCS and/or corresponding parameters may be included in the corresponding MCS table.

In one example, the corresponding modulation and coding scheme table may be a second modulation and coding scheme table obtained by changing parameters corresponding to one or more modulation and coding scheme indexes in a first modulation and coding scheme table. The first modulation and coding scheme table may be one or more of existing MCS tables, for example, one or more of respective MCS tables in Rel-15NR.

In another example, the corresponding modulation and coding scheme table may be a third modulation and coding scheme table obtained by adding one or more modulation and coding scheme indexes and parameters corresponding to the one or more modulation and coding scheme indexes to the first modulation and coding scheme table.

In another example, the corresponding modulation and coding scheme table may be at least one fourth modulation and coding scheme table separated from the first modulation and coding scheme table and obtained by constructing based on the modulation and coding scheme indexes and parameters corresponding to the modulation and coding scheme indexes. The first modulation and coding scheme table and the at least one fourth modulation and coding scheme tables correspond to different channel conditions and/or channel quality feedback conditions, respectively. In this case, tables in the first modulation and coding scheme table and the at least one fourth modulation and coding scheme table may be selected according to the channel conditions and/or channel quality feedback conditions. For example, a plurality of the first tables may be set, corresponding respectively to situations such as higher spectral efficiency and lower spectral efficiency, etc., and a plurality of the fourth tables may be set, each corresponding to situations such as higher spectral efficiency and lower spectral efficiency, etc. In this way, for scenarios with channel conditions (lower reliability requirements) and channel quality feedback conditions (shorter CQI reporting periods), a table with higher spectral efficiency in the existing first modulation and coding scheme table may be selected; for scenarios with higher reliability requirements and shorter CQI reporting periods, a table with lower spectral efficiency in the existing first modulation and coding scheme table may be selected; for scenarios with lower reliability requirements and longer CQI reporting periods, a table with higher spectral efficiency in a newly-created fourth modulation and coding scheme table may be selected; for scenarios with higher reliability requirements and longer CQI reporting periods, a table with lower spectral efficiency in the fourth modulation and coding scheme table may be selected. Of course, the content about the channel conditions and the channel quality feedback conditions described above are merely examples. In actual application scenarios, the modulation and coding scheme table may be selected according to any channel conditions and channel quality feedback conditions.

The second modulation and coding scheme table, the third modulation and coding scheme table, and the fourth modulation and coding scheme table described above will be described in detail later. In addition, the first modulation and coding scheme table, the second modulation and coding scheme table, the third modulation and coding scheme table, and the fourth modulation and coding scheme table may exist simultaneously, or only a part of the tables may exist. Optionally, the selection information used by the base station to select the foregoing tables may be indicated to the user equipment through indication information or RRC signaling, etc., to inform which table is selected for division and/or modulation. Of course, the selection information for the tables may also be determined by the user equipment and fed back to the base station, which is not limited herein. In addition, when the tables are selected by the user equipment but not notified to the base station, the base station may also receive transmission data transmitted by the user equipment through a blind detection method and the like to determine the modulation and coding scheme of the transmission data.

In step S1702, transmission data of the user equipment is received, the transmission data being generated by the user equipment splitting the information block to be transmitted into the plurality of sub-blocks according to the indication information and processing respective sub-blocks.

As described above, the indication information may include sizes or size partition ratios corresponding to respective sub-blocks. When the indication information includes sizes corresponding to respective sub-blocks, the information block to be transmitted may be directly split into the plurality of sub-blocks according to the sizes.

When the indication information includes size partition ratios corresponding to respective sub-blocks, the information block to be transmitted may be split into the plurality of sub-blocks in the following manner.

Specifically, in order to ensure the correctness of the data, in the case of transmitting the entire information block to be transmitted, additional bits (such as cyclic redundancy check (CRC) bits or other types of additional bits) need to be additionally transmitted for the information block to be transmitted, and then the information block may be transmitted. On the other hand, in the embodiments of the present invention, the information block to be transmitted is split into the plurality of sub-blocks for transmission, so it is necessary to additionally transmit additional bits to each sub-block for transmission. Considering the transmitting additional bits, various division methods may be adopted, for example, the following two example methods are used to split the information block to be transmitted.

Specifically, the information block size of the information block to be transmitted may be expressed as $N_{info}$. On this basis, when the information block to be transmitted of size $N_{info}$ is split into L (L≥1) sub-blocks, the sub-block sizes of respective sub-blocks may be expressed as $N_1, N_2, \ldots, N_L$, respectively.

In one implementation manner, the information block size of the information block to be transmitted may be equal to a sum of sub-block sizes of the respective sub-blocks, that is, $\Sigma_{l=1}^{L} N_l = N_{info}$. This example may transmit all the bits in the information block to be transmitted through the plurality of split sub-blocks, thereby ensuring the integrity of the content of the final transmitted data. Specifically, after knowing the information block size $N_{info}$ of the information block to be transmitted and the size partition ratio $W_l$ corresponding to respective sub-blocks, a sub-block calculation size of the $l^{th}$ sub-block may be expressed as $N'_l = N_{info} W_l$, 1≤l≤L. In this way, on the premise that the information block size of the information block to be transmitted is equal to the sum of the sub-block sizes of the respective sub-block, it is possible to ensure that the size partition ratios corresponding to respective sub-blocks are closest to the requirements of the actual application scenarios.

In another example, a sum of the information block size of the information block to be transmitted and a transmission additional bit length of the information block to be transmitted is equal to a sum of sub-block sizes of the respective sub-blocks and transmission additional bit lengths of the respective sub-blocks. This example may ensure that the number of bits of the transmitted data transmitted after the division is the same as that of the information block to be transmitted, thereby ensuring the same spectral efficiency. In another implementation manner, the sum of the information block size of the information block to be transmitted and the transmission additional bit length of the information block to be transmitted is equal to the sum of sub-block sizes of the respective sub-blocks and the transmission additional bit lengths of the respective sub-blocks. When it is satisfied that the sum of the information block size of the information block to be transmitted and the transmission additional bit length of the information block to be transmitted is equal to the sum of sub-block sizes of the respective sub-blocks and the transmission additional bit lengths of the respective sub-blocks, the information block size to be transmitted and each sub-block may be expressed as: $\Sigma_{l=1}^{L}(N_l+CRC_l)=N_{info}+CRC_{info}$, where $CRC_l$ is the length of the transmission additional bits of the $l^{th}$ sub-block, and $CRC_{info}$ is the length of the transmission additional bits of the information block to be transmitted. In this way, on the premise that the sum of the information block size of the information block to be transmitted and the transmission additional bit length of the information block to be transmitted is equal to the sum of sub-block sizes of the respective sub-blocks and the transmission additional bit lengths of the respective sub-blocks, it is possible to ensure that the size partition ratios corresponding to respective sub-blocks are closest to the requirements of the actual application scenarios.

In a second implementation manner of the embodiments of the present invention, when the indication information includes the modulation and coding scheme index (MCS index) and/or the parameters (for example, modulation order, target bit rate and/or spectral efficiency, etc., or constellation mapping information mentioned later) corresponding to the MCS index in a modulation and coding scheme table, as an example, the MCS index and/or the corresponding parameters may correspond to the indexes of the sub-block sizes in the TBS partition table, so that the splitting the information block to be transmitted into the plurality of sub-blocks according to the indication information may include: obtaining indexes of sub-block sizes corresponding to the modulation and coding scheme index and/or parameters corresponding to the modulation and coding scheme index according to the modulation and coding scheme index and/or parameters corresponding to the modulation and coding scheme index, and determining sub-block sizes of the respective sub-blocks according to the indexes of sub-block sizes. The modulation and coding scheme table corresponding to the MCS index and/or the corresponding parameters may include the aforementioned first modulation and coding scheme table, the second modulation and coding scheme table, the third modulation and coding scheme table, and/or the fourth modulation and coding scheme table.

FIG. 3(a) shows a schematic diagram of correspondence relationship between TBS index and MCS index according to the above implementation manner of the present invention; FIG. 3(b) shows one example of a TBS partition table according to the above implementation manner of the present invention. As shown in FIG. 3(a), after the MCS index is directly obtained according to the indication information, or the corresponding MCS index is obtained according to the parameters corresponding to the MCS index, the TBS index corresponding to the MCS index may be determined according to the correspondence relationship between the TBS index and the MCS index. Subsequently, the size partition ratios of respective sub-blocks corresponding to the TBS index may be determined according to the TBS partition table in FIG. 3(b). Then, according to the manner described above, the information block to be transmitted is split into the plurality of sub-blocks according to the size partition ratios of respective sub-blocks. Of course, FIG. 3(a) and FIG. 3(b) are only examples. In actual applications, the corresponding relationship in FIG. 3(a) and FIG. 3(b) may be expressed in any way. For example, it is also possible to use only one table to represent the contents of FIG. 3(a) and FIG. 3(b). In addition, the TBS partition table in FIG. 3(b) may not show the size partition ratios of the sub-blocks, but may be replaced with other parameters, such as the specific number of bits of respective sub-block sizes. The mapping relationship in FIG. 3(a) and/or FIG. 3(b) may be stored in advance at both ends of the base station and the user equipment, or may be signaled to the user equipment by the base station, or may be reported in advance by the user equipment to the base station, which is not limited herein.

In one implementation manner, the respective sub-blocks may be modulated by using a first type of modulation manner, respectively. The first type of modulation manner may be a relatively low-order modulation manner. The low-order modulation here and the subsequent high-order modulation are relative concepts, and are not strict limitations on the modulation manner. In this example, a relatively low-order constellation may be used for mapping for respective sub-blocks, respectively, and the mapping manner for respective sub-blocks may be the same or different. Subsequently, respective modulated sub-blocks may also be processed with signature (such as multiple access signature (MA signature)), respectively, and other processing (if any) may be performed on the processed transmission data, and then the processed transmission data may be combined into a single data sequence and transmitted out. The signature may include information indicating at least one of a power, a spreading sequence, a scrambling sequence, and an interleaving pattern and the like set for the corresponding sub-blocks, or may be other information specific to the corresponding sub-blocks, which is not limited herein. FIG. 4 shows a schematic diagram of modulating the respective sub-blocks by using a first type of modulation manner respectively according to this example of the present invention. As shown in FIG. 4, after the information block to be transmitted is split into sub-blocks 1 to L, respective sub-blocks may be modulated by using the first type of modulation manner, respectively, and respective modulated sub-blocks is processed by using the multiple access signature (MA signature), respectively. Then the processed sub-blocks are combined into a single data sequence, which is transmitted out as the transmission data. In one example, after the information block to be transmitted is split into the plurality of sub-blocks, and before the respective sub-blocks are modulated by using the first type of modulation manner respectively, channel coding is performed on respective sub-blocks. Optionally, respective sub-blocks may be encoded by using a forward error correction code (FEC). For example, respective sub-blocks may be encoded by additionally transmitting additional bits (such as cyclic redundancy check (CRC) bits or other types of additional bits). And then the encoded sub-blocks are respectively modulated by using the first type of modulation manner, respectively. In another example, before the information block to be transmitted is split into the plurality of sub-blocks, channel coding such as the forward error correction code (FEC) may be performed on the information block to be transmitted. Optionally, the information block to be transmitted may be encoded by additionally transmitting additional bits (such as cyclic redundancy check (CRC) bits or other types of additional bits), and then the encoded information block to be transmitted may be split into sub-blocks and the sub-blocks are modulated by using the first type of modulation manner, respectively.

In another implementation manner, the respective sub-blocks may also be converted into a single data sequence, and the single data sequence may be modulated by using a second type of modulation manner. Specifically, the bits in respective sub-blocks may be converted into the single data sequence by parallel-to-serial conversion, and the bits in the single data sequence may be derived from the corresponding sub-block according to the size partition ratios of respective sub-blocks. For example, when the first sub-block size is twice of the second sub-block size, the bits of the first sub-block and the second sub-block may be extracted respectively in the manner of 2:1, for example, to form the respective bits of the single data sequence. That is, two bits of the first sub-block may be extracted, and then one bit of the second sub-block may be extracted to form three bits of the single data sequence. Then, in a similar way, continue to extract the subsequent two bits of the first sub-block and the subsequent one bit of the second sub-block to form the subsequent three bits of the single data sequence, and so on. After converting respective sub-blocks into the single data sequence, the single data sequence may be modulated by using the second type of modulation manner. The second type of modulation manner may be a relatively high-order modulation manner. The high-order modulation here is also a relative concept, and is not a strict limitation on the modulation manner. In this example, a relatively high-order constellation may be used for mapping for the single data sequence, and then, after the modulation, the single data sequence may be processed with the signature (such as multiple access signature (MA signature)) and then the processed transmission data may be transmitted out. For example, the MA signature may include information indicating at least one of the power, the spreading sequence, the scrambling code sequence, and the interleaving pattern and the like. Of course, the MA signature may not include the foregoing information, which is no limited herein. FIG. 5 shows a schematic diagram of modulating of converted single data sequence by using the second type modulation manner according to this example of the present invention. As shown in FIG. 5, after the information block to be transmitted is split into sub-blocks 1 to L, respective sub-blocks may be converted into the single data sequence by parallel-to-serial conversion, and the data sequence may be modulated by using the second type of modulation manner. Subsequently, the modulated result may also be processed by using the multiple access signature (MA signature) and transmitted out as the transmission data. In one example, after the information block to be transmitted is split into the plurality of sub-blocks, and before respective sub-blocks are converted into the single data sequence and the single data sequence is modulated by using the second type modulation manner, channel coding is performed on each respective sub-blocks. Optionally, respective sub-blocks may be encoded by using the forward error correction code (FEC). For example, respective sub-blocks may be encoded by additionally transmitting additional bits (such as cyclic redundancy check (CRC) bits or other types of additional bits). And then the encoded sub-blocks are converted into the single data sequence and modulated by using the second type of modulation manner. In another example, before the information block to be transmitted is split into the plurality of sub-blocks, channel coding such as the forward error correction code (FEC) may be performed on the information block to be transmitted. Optionally, the information block to be transmitted may be encoded by additionally transmitting additional bits (such as cyclic redundancy check (CRC) bits or other types of additional bits), and then the encoded information block to be transmitted may be split into sub-blocks and converted into the data sequence, to perform modulating by using the second type of modulation manner.

Optionally, parameters corresponding to the modulation and coding scheme index value include the constellation mapping information; and the transmission data is generated by mapping the single bit sequence by using the constellation mapping information.

In one example, the relatively higher-order constellation used in the second type of modulation manner may be one of the existing constellations such as 8QAM, 16QAM, 64QAM, 128QAM, and the like. At this time, the constellation mapping information may include information of an initial constellation, so that the initial constellation is used for mapping. At this time, the single data sequence may be split into a plurality of sub-channels, and different sub-channels of the single data sequence may be mapped using the initial constellation. In this case, the constellation mapping information may further include the number of bits in the single data sequence that respectively correspond to different sub-channels, or the sequence numbers of different sub-channels corresponding to each bit in the single data sequence, respectively. For example, when a 16QAM constellation is used to map one group of data sequence containing 4-bits, two sub-channels may be defined, where one sub-channel has 1 bit, and the other sub-channel has 3 bits. Then, the constellation mapping information may be expressed as: (16Q, 1, 3), which respectively represent a 16QAM constellation, one bit in one bit group which is the first sub-channel, and three bits which are the second sub-channel. Alternatively, the constellation mapping information may be expressed as (16Q, 1, 2, 2, 2), which respectively represents a 16QAM constellation, the first bit in one bit group which is the first sub-channel, and the second to fourth bits which are the second sub-channel. At this time, since the second sub-channel has more bits than the first sub-channel, the second sub-channel has a larger capacity than the first sub-channel, and thus has higher reliability when transmitting the same amount of information. Therefore, data with higher priority may be mapped to the second sub-channel, and data with lower priority may be mapped to the first sub-channel. Each sub-channel may transmit independent coded codewords.

Alternatively, the relatively higher-order constellation used in the second type of modulation manner may be a synthetic constellation generated according to the constellation mapping information. In one example, the constellation mapping information may include information of one or more initial constellations and/or adjustment factors corresponding to the initial constellations, wherein the adjustment factors may include power ratios and/or rotation angles corresponding to the initial constellations. Therefore, the modulating the single data sequence by using the second type of modulation manner may include: generating a synthetic constellation by using the information of the initial constellation, the power ratios and/or the rotation angles corresponding to the initial constellations, and mapping the single data sequence by using the synthetic constellations. In the above example, the information of the initial constellations may be information representing one or more of constellations such as BPSK, QPSK, 16QAM, 64QAM, 128QAM, etc. In addition, the information of the initial constellations may also represent information of bits of a constellation indicated by the initial constellations. For example, $b_1$, $b_2$, $b_3$, $b_4$, etc. may be used to represent each bit. Further, $B(b_1)$, $Q(b_1, b_2)$ or $16Q(b_1, b_2, b_3, b_4)$ may be used as information of the initial constellations, where $B(b_1)$ represents BPSK for $b_1$, $Q(b_1, b_2)$ may represent QPSK for $b_1$, $b_2$, and $16Q(b_1, b_2, b_3, b_4)$ may represent 16QAM for $b_1$, $b_2$, $b_3$, $b_4$, and so on. Of course, the bit representation may also be omitted, and only B is used for BPSK, Q for QPSK, and 16Q/M for 16QAM. Taking the case where there are two initial constellations as an example, the power ratios corresponding to the two initial constellations may be $a_1$ and $a_2$, respectively, where $a_1, a_2 \in \mathbb{R}^+$, $|a_1|^2+|a_2|^2=1$, and the rotation angle $\Phi \in [0, 2\pi]$. The above power ratios and/or the rotation angle may be indicated by the base station according to the current channel feedback status and signaled to the user equipment, or may be determined by the user equipment itself, which is not limited herein. Optionally, when the single data sequence includes a plurality of bits in group of 2 bits, assuming that the information of the initial constellations is (B, B, $a_1$, $a_2$, $\varphi$), then the synthesized constellation may be expressed as $x=a_1 B(b_1)+a_2 e^{-i\varphi} B(b_2)$. When the single data sequence contains groups of 4 bits, assuming that the information of the initial constellations is (Q, Q, $a_1$, $a_2$, $\varphi$), then the synthetic constellation may be expressed as $x=a_1 Q(b_1, b_2)+a_2 e^{-i\varphi} Q(b_3, b_4)$. When the single data sequence contains groups of 6 bits, assuming that the information of the initial constellations is (Q, M, $a_1$, $a_2$, $\varphi$), then the synthetic constellation may be expressed as $x=a_1 Q(b_1, b_2)+a_2 e^{-i\varphi} M(b_3, b_4, b_5, b_6)$. When the single data sequence contains groups of 8 bits, it may be assumed that the information of the initial constellations is (M, M, $a_1$, $a_2$, $\varphi$), then the synthetic constellation may be expressed as $x=a_1 M(b_1, b_2, b_3, b_4)+a_2 e^{-i\varphi} M(b_5, b_6, b_7, b_8)$. FIGS. 6 to 8 show three examples of the synthetic constellation according to the embodiment of the present invention, where the synthetic constellation in FIG. 6 is composed of two BPSK constellations, and the BPSK constellation with a power ratio of $a_2$ is rotated by $\varphi=45°$. The synthetic constellation in FIG. 7 is composed of BPSK and QPSK constellations, and the QPSK constellation is rotated by $\varphi=45°$. The synthetic constellation in FIG. 8 is composed of two QPSK constellations, and the QPSK constellation with a power ratio of $a_2$ is rotated by $\varphi=45°$. As in the synthetic constellation shown in FIGS. 6-8, the distance between each constellation point may be adjusted by adjusting values of the power factors $a_1$ and $a_2$, so as to obtain different reliabilities corresponding to different sub-channels, to achieve rate division and thereby avoiding degradation of channel transmission performance and capacity due to channel conditions or channel feedback.

In one example, the constellation mapping information may be from the parameters corresponding to the aforementioned modulation and coding scheme index. Specifically, the indication information may indicate the constellation mapping information included in the corresponding modulation and coding scheme table by indicating a modulation and coding scheme index and/or parameters corresponding to the modulation and coding scheme index in the modulation and coding scheme table.

In another example, the constellation mapping information may be constructed into one or more constellation mapping information tables, and the constellation mapping information table may include information such as the initial constellation information, the power ratios and/or rotation angles corresponding to the initial constellation. Therefore, the indication information may be indication information for indicating the constellation mapping information in the constellation mapping information table. For example, the indication information may indicate the initial constellation information in the constellation mapping information, the power ratios and/or the rotation angles corresponding to the initial constellation, through indexes in the constellation mapping information table. Optionally, the constellation mapping information table may include information on the power ratios and/or rotation angles corresponding to the initial constellation, and the indication information may indicate the power ratios and/or rotation angles corresponding to the initial constellations in the constellation mapping information through indexes in the constellation mapping information table. In this example, the initial constellation information may be separately indicated through signaling such as RRC. FIG. 9 shows a constellation mapping information table according to one embodiment of the present invention. The constellation mapping information table shown in FIG. 9 includes the power ratios and rotation angles corresponding to the initial constellation. Specifically, the power ratios and rotation angles information in the constellation mapping information table may be determined by using the constellation mapping information index transmitted by the indication information. For example, through the index 1 in the constellation mapping information table, the indication information may indicate that the power ratio of $a_1$ and $a_2$ is 2:1, and the rotation angle $\varphi$ is $\pi/4$.

According to the information receiving method of the embodiments of the present invention, the information block to be transmitted of the user equipment may be split into the plurality of sub-blocks by using the indication information transmitted by the base station, and each sub-block is processed accordingly, so that it can be adapted to different wireless network channel conditions to transmit information and improve channel transmission quality.

A user equipment according to the embodiments of the present application is described below with reference to FIG. 18. The user equipment may perform the above-mentioned information transmitting method. Since the operations of the user equipment are substantially the same as the steps of the information transmitting method described above, only a brief description thereof will be made herein, and a repeated description of the same content will be omitted.

Figure 18:
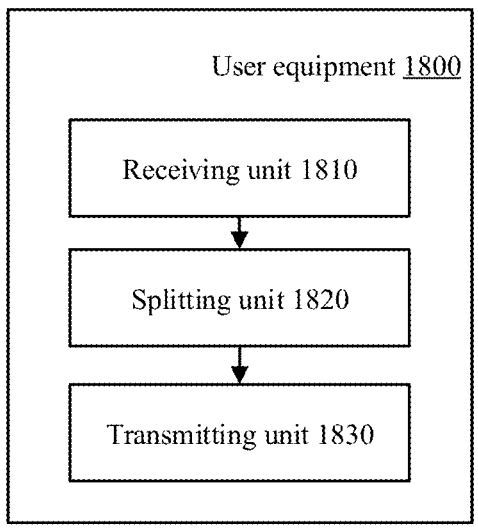
FIG. 18 shows a structural block diagram of a user equipment according to one embodiment of the present invention.

As shown in FIG. 18, a user equipment 1800 includes a receiving unit 1810, a splitting unit 1820, and a transmitting unit 1830. It will be appreciated that FIG. 18 only shows components related to the embodiments of the present application, while other components are omitted, but this is only illustrative, and the user equipment 1800 may include other components according to needs.

The receiving unit 1810 is configured to receive indication information, the indication information indicating sub-block sizes of a plurality of sub-blocks obtained by splitting an information block to be transmitted.

In the embodiments of the present invention, the information block to be transmitted may be a transmission block, and accordingly, the sub-block sizes of the information block may also be sub-block sizes of the transmission block.

In a first implementation manner of the embodiments of the present invention, the indication information may include sizes and/or size partition ratios corresponding to respective sub-blocks.

In a second implementation manner of the embodiments of the present invention, the indication information may include modulation and coding scheme index (MCS index) and/or parameters (for example, modulation order, target bit rate and/or spectral efficiency, etc., or constellation mapping information mentioned later) corresponding to the MCS index in a modulation and coding scheme table. For example, a correspondence table between the MCS index and the sub-block sizes and/or size partition ratios of respective sub-blocks may be set, so that the sub-block sizes and/or size partition ratios may be determined through the index indicated by the indication information. Alternatively, a transmission block size (TBS) partition table may be set, and the TBS partition table may include indexes of sub-block sizes, the sub-block sizes and/or the size partition ratios corresponding to indexes of sub-block sizes, and the MCS index or its corresponding parameters may correspond to the indexes of sub-block sizes in the TBS partition table, so that the corresponding sub-block sizes and/or the size partition ratios may be determined according to the MCS index or its corresponding parameters.

In the above implementation manner of determining the respective sub-block sizes through the MCS index and/or corresponding parameters, the MCS and/or corresponding parameters may be included in the corresponding MCS table.

In one example, the corresponding modulation and coding scheme table may be a second modulation and coding scheme table obtained by changing parameters corresponding to one or more modulation and coding scheme indexes in a first modulation and coding scheme table. The first modulation and coding scheme table may be one or more of existing MCS tables, for example, one or more of respective MCS tables in Rel-15NR.

In another example, the corresponding modulation and coding scheme table may be a third modulation and coding scheme table obtained by adding one or more modulation and coding scheme indexes and parameters corresponding to the one or more modulation and coding scheme indexes to the first modulation and coding scheme table.

In another example, the corresponding modulation and coding scheme table may be at least one fourth modulation and coding scheme table separated from the first modulation and coding scheme table and obtained by constructing based on the modulation and coding scheme indexes and parameters corresponding to the modulation and coding scheme indexes. The first modulation and coding scheme table and the at least one fourth modulation and coding scheme tables correspond to different channel conditions and/or channel quality feedback conditions, respectively. In this case, tables in the first modulation and coding scheme table and the at least one fourth modulation and coding scheme table may be selected according to the channel conditions and/or channel quality feedback conditions. For example, a plurality of the first tables may be set, corresponding respectively to situations such as higher spectral efficiency and lower spectral efficiency, etc., and a plurality of the fourth tables may be set, each corresponding to situations such as higher spectral efficiency and lower spectral efficiency, etc. In this way, for scenarios with channel conditions (lower reliability requirements) and channel quality feedback conditions (shorter CQI reporting periods), a table with higher spectral efficiency in the existing first modulation and coding scheme table may be selected; for scenarios with higher reliability requirements and shorter CQI reporting periods, a table with lower spectral efficiency in the existing first modulation and coding scheme table may be selected; for scenarios with lower reliability requirements and longer CQI reporting periods, a table with higher spectral efficiency in a newly-created fourth modulation and coding scheme table may be selected; for scenarios with higher reliability requirements and longer CQI reporting periods, a table with lower spectral efficiency in the fourth modulation and coding scheme table may be selected. Of course, the content about the channel conditions and the channel quality feedback conditions described above are merely examples. In actual application scenarios, the modulation and coding scheme table may be selected according to any channel conditions and channel quality feedback conditions.

The first modulation and coding scheme table, the second modulation and coding scheme table, the third modulation and coding scheme table, and the fourth modulation and coding scheme table may exist simultaneously, or only a part of the tables may exist. Optionally, selection information used to select the foregoing tables may be indicated to the user equipment through indication information or RRC signaling, etc., to inform which table is selected for division and/or modulation. Of course, the selection information for the tables may also be determined by the user equipment and fed back to the base station, which is not limited herein. In addition, when the tables are selected by the user equipment but not notified to the base station, the base station may also receive transmission data transmitted by the user equipment through a blind detection method and the like to determine the modulation and coding scheme of the transmission data.

The splitting unit 1820 is configured to split the information block to be transmitted into the plurality of sub-blocks according to the indication information.

As described above, the indication information may include sizes or size partition ratios corresponding to respective sub-blocks. When the indication information includes sizes corresponding to respective sub-blocks, the information block to be transmitted may be directly split into the plurality of sub-blocks according to the sizes.

When the indication information includes size partition ratios corresponding to respective sub-blocks, the information block to be transmitted may be split into the plurality of sub-blocks in the following manner.

Specifically, in order to ensure the correctness of the data, in the case of transmitting the entire information block to be transmitted, additional bits (such as cyclic redundancy check (CRC) bits or other types of additional bits) need to be additionally transmitted for the information block to be transmitted, and then the information block may be transmitted. On the other hand, in the embodiments of the present invention, the information block to be transmitted is split into the plurality of sub-blocks for transmission, so it is necessary to additionally transmit additional bits to each sub-blocks for transmission. Considering the transmitting additional bits, various division methods may be adopted, for example, the following two example methods are used to split the information block to be transmitted.

In one example, the information block size of the information block to be transmitted may be expressed as $N_{info}$, which indicates, for example, the number of bits included in the information block to be transmitted, where:

$$N_{info} = v \cdot \overline{N}'_{RE} \cdot n_{PRB} \cdot R \cdot Q_m$$

$v$ is the number of data streams to be transmitted by the user equipment, $\overline{N}'_{RE}$ is the quantized number of resource elements (RE) of each physical resource block (PRB), $n_{PRB}$ is the number of PRBs, R is the target bit rate multiplied by [1024], and $Q_m$ is the modulation order. On this basis, when the information block to be transmitted of size $N_{info}$ is split into L (L≥1) sub-blocks, the sub-block sizes of respective sub-blocks may be expressed as $N_1, N_2, \ldots, N_L$, respectively.

In one implementation manner, the information block size of the information block to be transmitted may be equal to a sum of sub-block sizes of the respective sub-blocks, that is, $\Sigma_{l=1}^{L} N_l = N_{info}$. This example may transmit all the bits in the information block to be transmitted through the plurality of split sub-blocks, thereby ensuring the integrity of the content of the final transmitted data. Specifically, after knowing the information block size $N_{info}$ of the information block to be transmitted and the size partition ratio $W_l$ corresponding to respective sub-blocks, a sub-block calculation size of the $l^{th}$ sub-block may be expressed as $N'_l = N_{info} W_l$, $1 \leq l \leq L$. In this way, on the premise that the information block size of the information block to be transmitted is equal to the sum of the sub-block sizes of the respective sub-block, it is possible to ensure that the size partition ratios corresponding to respective sub-blocks are closest to the requirements of the actual application scenarios.

In another implementation manner, a sum of the information block size of the information block to be transmitted and a transmission additional bit length of the information block to be transmitted is equal to a sum of sub-block sizes of the respective sub-blocks and transmission additional bit lengths of the respective sub-blocks. In this way, on the premise that the sum of the information block size of the information block to be transmitted and the transmission additional bit length of the information block to be transmitted is equal to the sum of sub-block sizes of the respective sub-blocks and the transmission additional bit lengths of the respective sub-blocks, it is possible to ensure that the size partition ratios corresponding to respective sub-blocks are closest to the requirements of the actual application scenarios.

Alternatively, the indication information includes the modulation and coding scheme index (MCS index) and/or the parameters (for example, modulation order, target bit rate and/or spectral efficiency, etc., or constellation mapping information mentioned later) corresponding to the MCS index in a modulation and coding scheme table. In this case, as an example, the MCS index and/or the corresponding parameters may correspond to the indexes of the sub-block sizes in the TBS partition table, so that the splitting the information block to be transmitted into the plurality of sub-blocks according to the indication information may include: obtaining indexes of sub-block sizes corresponding to the modulation and coding scheme index and/or parameters corresponding to the modulation and coding scheme index according to the modulation and coding scheme index and/or parameters corresponding to the modulation and coding scheme index, and determining sub-block sizes of the respective sub-blocks according to the indexes of sub-block sizes. The modulation and coding scheme table corresponding to the MCS index and/or the corresponding parameters may include the aforementioned first modulation and coding scheme table, the second modulation and coding scheme table, the third modulation and coding scheme table, and/or the fourth modulation and coding scheme table.

FIG. 3(a) shows a schematic diagram of correspondence relationship between TBS index and MCS index according to the above implementation manner of the present invention; FIG. 3(b) shows one example of a TBS partition table according to the above implementation manner of the present invention. As shown in FIG. 3(a), after the MCS index is directly obtained according to the indication information, or the corresponding MCS index is obtained according to the parameters corresponding to the MCS index, the TBS index corresponding to the MCS index may be determined according to the correspondence relationship between the TBS index and the MCS index. Subsequently, the size partition ratios of respective sub-blocks corresponding to the TBS index may be determined according to the TBS partition table in FIG. 3(b). Then, according to the manner described above, the information block to be transmitted is split into the plurality of sub-blocks according to the size partition ratios of respective sub-blocks. Of course, FIG. 3(a) and FIG. 3(b) are only examples. In actual applications, the corresponding relationship in FIG. 3(a) and FIG. 3(b) may be expressed in any way. For example, it is also possible to use only one table to represent the contents of FIG. 3(a) and FIG. 3(b). In addition, the TBS partition table in FIG. 3(b) may not show the size partition ratios of the sub-blocks, but may be replaced with other parameters, such as the specific number of bits of respective sub-block sizes. The mapping relationship in FIG. 3(a) and/or FIG. 3(b) may be stored in advance at both ends of the base station and the user equipment, or may be signaled to the user equipment by the base station, or may be reported in advance by the user equipment to the base station, which is not limited herein.

The transmitting unit 1830 is configured to process respective sub-blocks to generate transmission data, and transmitting the transmission data.

In one implementation manner, the respective sub-blocks may be modulated by using a first type of modulation manner, respectively. The first type of modulation manner may be a relatively low-order modulation manner. The low-order modulation here and the subsequent high-order modulation are relative concepts, and are not strict limitations on the modulation manner. In this example, a relatively low-order constellation may be used for mapping for respective sub-blocks, respectively, and the mapping manner for respective sub-blocks may be the same or different. Subsequently, respective modulated sub-blocks may also be processed with signature (such as multiple access signature (MA signature)), respectively, and other processing (if any) may be performed on the processed transmission data, and then the processed transmission data may be combined into a single data sequence and transmitted out. The signature may include information indicating at least one of a power, a spreading sequence, a scrambling sequence, and an interleaving pattern and the like set for the corresponding sub-blocks, or may be other information specific to the corresponding sub-blocks, which is not limited herein. FIG. 4 shows a schematic diagram of modulating the respective sub-blocks by using a first type of modulation manner respectively according to this example of the present invention. As shown in FIG. 4, after the information block to be transmitted is split into sub-blocks 1 to L, respective sub-blocks may be modulated by using the first type of modulation manner, respectively, and respective modulated sub-blocks is processed by using the multiple access signature (MA signature), respectively. Then the processed sub-blocks are combined into a single data sequence, which is transmitted out as the transmission data. In one example, the user equipment may perform channel coding on respective sub-blocks after splitting the information block to be transmitted into the plurality of sub-blocks, and before modulating the respective sub-blocks by using the first type of modulation manner respectively. Optionally, respective sub-blocks may be encoded by using a forward error correction code (FEC). For example, respective sub-blocks may be encoded by additionally transmitting additional bits (such as cyclic redundancy check (CRC) bits or other types of additional bits). And then the encoded sub-blocks are respectively modulated by using the first type of modulation manner, respectively. In another example, before the information block to be transmitted is split into the plurality of sub-blocks, channel coding such as the forward error correction code (FEC) may be performed on the information block to be transmitted. Optionally, the information block to be transmitted may be encoded by additionally transmitting additional bits (such as cyclic redundancy check (CRC) bits or other types of additional bits), and then the encoded information block to be transmitted may be split into sub-blocks and the sub-blocks are modulated by using the first type of modulation manner, respectively.

In another implementation manner, the respective sub-blocks may also be converted into a single data sequence, and the single data sequence may be modulated by using a second type of modulation manner. Specifically, the bits in respective sub-blocks may be converted into the single data sequence by parallel-to-serial conversion, and the bits in the single data sequence may be derived from the corresponding sub-block according to the size partition ratios of respective sub-blocks. For example, when the first sub-block size is twice of the second sub-block size, the bits of the first sub-block and the second sub-block may be extracted respectively in the manner of 2:1, for example, to form the respective bits of the single data sequence. That is, two bits of the first sub-block may be extracted, and then one bit of the second sub-block may be extracted to form three bits of the single data sequence. Then, in a similar way, continue to extract the subsequent two bits of the first sub-block and the subsequent one bit of the second sub-block to form the subsequent three bits of the single data sequence, and so on. After converting respective sub-blocks into the single data sequence, the single data sequence may be modulated by using the second type of modulation manner. The second type of modulation manner may be a relatively high-order modulation manner. The high-order modulation here is also a relative concept, and is not a strict limitation on the modulation manner. In this example, a relatively high-order constellation may be used for mapping for the single data sequence, and then, after the modulation, the single data sequence may be processed with the signature (such as multiple access signature (MA signature)) and then the processed transmission data may be transmitted out. For example, the MA signature may include information indicating at least one of the power, the spreading sequence, the scrambling code sequence, and the interleaving pattern and the like. Of course, the MA signature may not include the foregoing information, which is no limited herein. FIG. 5 shows a schematic diagram of modulating of converted single data sequence by using the second type modulation manner according to this example of the present invention. As shown in FIG. 5, after the information block to be transmitted is split into sub-blocks 1 to L, respective sub-blocks may be converted into the single data sequence by parallel-to-serial conversion, and the data sequence may be modulated by using the second type of modulation manner. Subsequently, the modulated result may also be processed by using the multiple access signature (MA signature) and transmitted out as the transmission data. In one example, the user equipment may perform channel coding on each respective sub-blocks after splitting the information block to be transmitted into the plurality of sub-blocks, and before converting respective sub-blocks into the single data sequence and modulating the single data sequence by using the second type modulation manner. Optionally, respective sub-blocks may be encoded by using the forward error correction code (FEC). For example, respective sub-blocks may be encoded by additionally transmitting additional bits (such as cyclic redundancy check (CRC) bits or other types of additional bits). And then the encoded sub-blocks are converted into the single data sequence and modulated by using the second type of modulation manner. In another example, before the information block to be transmitted is split into the plurality of sub-blocks, channel coding such as the forward error correction code (FEC) may be performed on the information block to be transmitted. Optionally, the information block to be transmitted may be encoded by additionally transmitting additional bits (such as cyclic redundancy check (CRC) bits or other types of additional bits), and then the encoded information block to be transmitted may be split into sub-blocks and converted into the data sequence, to perform modulating by using the second type of modulation manner.

Optionally, the performing modulation on the single data sequence by using a second type of modulation manner may include: mapping the single data sequence by using the constellation mapping information. As described above, the constellation mapping information may be included in the parameters corresponding to the modulation and coding scheme index.

In one example, the relatively higher-order constellation used in the second type of modulation manner may be one of the existing constellations such as 8QAM, 16QAM, 64QAM, 128QAM, and the like. At this time, the constellation mapping information may include information of an initial constellation, so that the initial constellation is used for mapping. At this time, the single data sequence may be split into a plurality of sub-channels, and different sub-channels of the single data sequence may be mapped using the initial constellation. In this case, the constellation mapping information may further include the number of bits in the single data sequence that respectively correspond to different sub-channels, or the sequence numbers of different sub-channels corresponding to each bit in the single data sequence, respectively. For example, when a 16QAM constellation is used to map one group of data sequence containing 4-bits, two sub-channels may be defined, where one sub-channel has 1 bit, and the other sub-channel has 3 bits. Then, the constellation mapping information may be expressed as: (16Q, 1, 3), which respectively represent a 16QAM constellation, one bit in one bit group which is the first sub-channel, and three bits which are the second sub-channel. Alternatively, the constellation mapping information may be expressed as (16Q, 1, 2, 2, 2), which respectively represents a 16QAM constellation, the first bit in one bit group which is the first sub-channel, and the second to fourth bits which are the second sub-channel. At this time, since the second sub-channel has more bits than the first sub-channel, the second sub-channel has a larger capacity than the first sub-channel, and thus has higher reliability when transmitting the same amount of information. Therefore, data with higher priority may be mapped to the second sub-channel, and data with lower priority may be mapped to the first sub-channel. Each sub-channel may transmit independent coded codewords.

Alternatively, the relatively higher-order constellation used in the second type of modulation manner may be a synthetic constellation generated according to the constellation mapping information. In one example, the constellation mapping information may include information of one or more initial constellations and/or adjustment factors corresponding to the initial constellations, wherein the adjustment factors may include power ratios and/or rotation angles corresponding to the initial constellations. Therefore, the modulating the single data sequence by using the second type of modulation manner may include: generating a synthetic constellation by using the information of the initial constellation, the power ratios and/or the rotation angles corresponding to the initial constellations, and mapping the single data sequence by using the synthetic constellations. In the above example, the information of the initial constellations may be information representing one or more of constellations such as BPSK, QPSK, 16QAM, 64QAM, 128QAM, etc. In addition, the information of the initial constellations may also represent information of bits of a constellation indicated by the initial constellations. For example, $b_1$, $b_2$, $b_3$, $b_4$, etc. may be used to represent each bit. Further, $B(b_1)$, $Q(b_1, b_2)$ or $16Q(b_1, b_2, b_3, b_4)$ may be used as information of the initial constellations, where $B(b_1)$ represents BPSK for $b_1$, $Q(b_1, b_2)$ may represent QPSK for $b_1$, $b_2$, and $16Q(b_1, b_2, b_3, b_4)$ may represent 16QAM for $b_1$, $b_2$, $b_3$, $b_4$, and so on. Of course, the bit representation may also be omitted, and only B is used for BPSK, Q for QPSK, and 16Q/M for 16QAM. Taking the case where there are two initial constellations as an example, the power ratios corresponding to the two initial constellations may be $a_1$ and $a_2$, respectively, where $a_1$, $a_2 \in \mathbb{R}^+$, $|a_1|^2+|a_2|^2=1$, and the rotation angle $\Phi \in [0, 2\pi]$. The above power ratios and/or the rotation angle may be indicated by the base station according to the current channel feedback status and signaled to the user equipment, or may be determined by the user equipment itself, which is not limited herein. Optionally, when the single data sequence includes a plurality of bits in group of 2 bits, assuming that the information of the initial constellations is $(B, B, a_1, a_2, \varphi)$, then the synthesized constellation may be expressed as $x=a_1 B(b_1)+a_2 e^{-i\varphi} B(b_2)$. When the single data sequence contains groups of 4 bits, assuming that the information of the initial constellations is $(Q, Q, a_1, a_2, \varphi)$, then the synthetic constellation may be expressed as $x=a_1 Q(b_1, b_2)+a_2 e^{-i\varphi} Q(b_3, b_4)$. When the single data sequence contains groups of 6 bits, assuming that the information of the initial constellations is $(Q, M, a_1, a_2, \varphi)$, then the synthetic constellation may be expressed as $x=a_1 Q(b_1, b_2)+a_2 e^{-i\varphi} M(b_3, b_4, b_5, b_6)$. When the single data sequence contains groups of 8 bits, it may be assumed that the information of the initial constellations is $(M, M, a_1, a_2, \varphi)$, then the synthetic constellation may be expressed as $x=a_1 M(b_1, b_2, b_3, b_4)+a_2 e^{-i\varphi} M(b_5, b_6, b_7, b_8)$. FIGS. 6 to 8 show three examples of the synthetic constellation according to the embodiment of the present invention, where the synthetic constellation in FIG. 6 is composed of two BPSK constellations, and the BPSK constellation with a power ratio of $a_2$ is rotated by $\varphi=45°$. The synthetic constellation in FIG. 7 is composed of BPSK and QPSK constellations, and the QPSK constellation is rotated by $\varphi=45°$. The synthetic constellation in FIG. 8 is composed of two QPSK constellations, and the QPSK constellation with a power ratio of $a_2$ is rotated by $\varphi=45°$. As in the synthetic constellation shown in FIGS. 6-8, the distance between each constellation point may be adjusted by adjusting values of the power factors $a_1$ and $a_2$, so as to obtain different reliabilities corresponding to different sub-channels, to achieve rate division and thereby avoiding degradation of channel transmission performance and capacity due to channel conditions or channel feedback.

In one example, the constellation mapping information may be from the parameters corresponding to the aforementioned modulation and coding scheme index. Specifically, the indication information may indicate the constellation mapping information included in the corresponding modulation and coding scheme table by indicating a modulation and coding scheme index and/or parameters corresponding to the modulation and coding scheme index in the modulation and coding scheme table.

In another example, the constellation mapping information may be constructed into one or more constellation mapping information tables, and the constellation mapping information table may include information such as the initial constellation information, the power ratios and/or rotation angles corresponding to the initial constellation. Therefore, the indication information may be indication information for indicating the constellation mapping information in the constellation mapping information table. For example, the indication information may indicate the initial constellation information in the constellation mapping information, the power ratios and/or the rotation angles corresponding to the initial constellation, through indexes in the constellation mapping information table. Optionally, the constellation mapping information table may include information on the power ratios and/or rotation angles corresponding to the initial constellation, and the indication information may indicate the power ratios and/or rotation angles corresponding to the initial constellations in the constellation mapping information through indexes in the constellation mapping information table. In this example, the initial constellation information may be separately indicated through signaling such as RRC. FIG. 9 shows a constellation mapping information table according to one embodiment of the present invention. The constellation mapping information table shown in FIG. 9 includes the power ratios and rotation angles corresponding to the initial constellation. Specifically, the power ratios and rotation angles information in the constellation mapping information table may be determined by using the constellation mapping information index transmitted by the indication information. For example, through the index 1 in the constellation mapping information table, the indication information may indicate that the power ratio of $a_1$ and $a_2$ is 2:1, and the rotation angle $\varphi$ is $\pi/4$.

According to the user equipment according to the embodiments of the present invention, the information block to be transmitted of the user equipment may be split into the plurality of sub-blocks by using the indication information transmitted by the base station, and each sub-block is processed accordingly, so that it can be adapted to different wireless network channel conditions to transmit information and improve channel transmission quality.

A base station according to the embodiments of the present application is described below with reference to FIG. 19. The base station may perform the above-mentioned information receiving method. Since the operations of the base station are substantially the same as the steps of the information receiving method described above, only a brief description thereof will be made herein, and a repeated description of the same content will be omitted.

Figure 19:
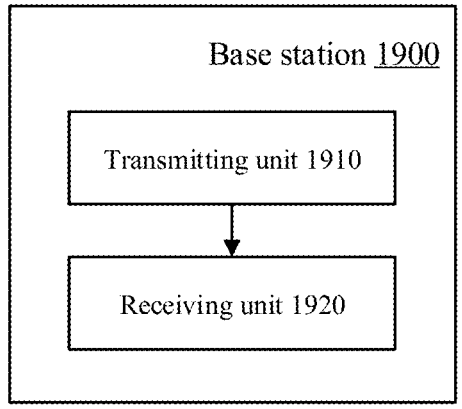
FIG. 19 shows a structural block diagram of a base station according to one embodiment of the present invention.
Figure 20:
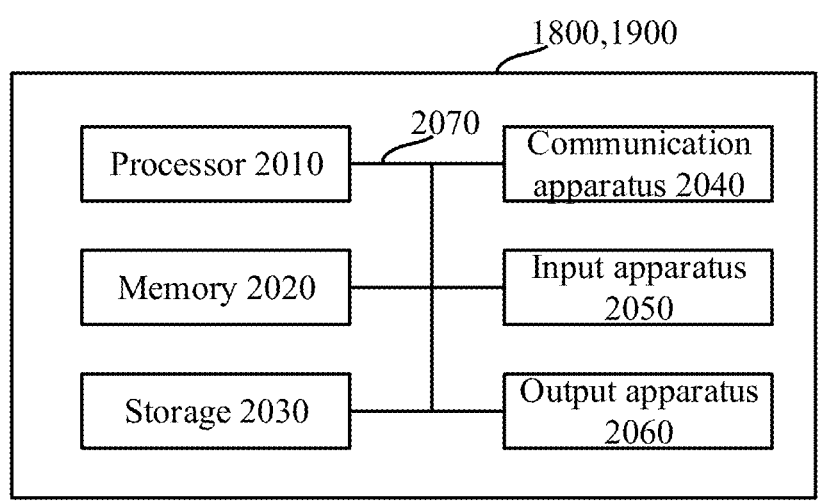
FIG. 20 shows a diagram of an example of a hardware structure of the user equipment and the base station involved in one embodiment of the present invention.

As shown in FIG. 19, a base station 1900 includes a transmitting unit 1910 and a receiving unit 1920. It should be appreciated that FIG. 19 only shows components related to the embodiments of the present application, while other components are omitted, but this is only illustrative, and the base station 1900 may include other components according to needs.

The transmitting unit 1910 is configured to transmit indication information, the indication information indicating sub-block sizes of a plurality of sub-blocks obtained by splitting an information block to be transmitted by a user equipment.

In the embodiments of the present invention, the information block to be transmitted may be a transmission block, and accordingly, the sub-block sizes of the information block may also be sub-block sizes of the transmission block.

In the embodiments of the present invention, the information block to be transmitted may be a transmission block, and accordingly, the sub-block sizes of the information block may also be sub-block sizes of the transmission block In a first implementation manner of the embodiments of the present invention, the indication information may include sizes and/or size partition ratios corresponding to the plurality of sub-blocks obtained by the user equipment by splitting the information block to be transmitted.

In practical applications, the indication information may directly indicate the respective split sub-block sizes, or directly indicate the size partition ratios of respective split sub-blocks. Alternatively, the indication information may indirectly indicate the size partition ratios of respective sub-blocks by indicating specific content corresponding to a certain/some size partition ratios in a table containing the size partition ratios. The table may be stored in advance on both ends of the user equipment and the base station, and may be signaled to the user equipment by the base station, or may be reported in advance by the user equipment to the base station, which is not limited herein.

In another example of the above scenario, a sum of the information block size of the information block to be transmitted and a transmission additional bit length of the information block to be transmitted is equal to a sum of sub-block sizes of the respective sub-blocks and transmission additional bit lengths of the respective sub-blocks. This example may ensure that the number of bits of the transmitted data transmitted after the division is the same as that of the information block to be transmitted, thereby ensuring the same spectral efficiency.

In a second implementation manner of the embodiments of the present invention, the indication information may include modulation and coding scheme index (MCS index) and/or parameters (for example, modulation order, target bit rate and/or spectral efficiency, etc., or constellation mapping information mentioned later) corresponding to the MCS index in a modulation and coding scheme table. For example, a correspondence table between the MCS index and the sub-block sizes and/or size partition ratios of respective sub-blocks may be set, so that the sub-block sizes and/or size partition ratios may be determined through the index indicated by the indication information. Alternatively, a transmission block size (TBS) partition table may be set, and the TBS partition table may include indexes of sub-block sizes, the sub-block sizes and/or the size partition ratios corresponding to indexes of sub-block sizes, and the MCS index or its corresponding parameters may correspond to the indexes of sub-block sizes in the TBS partition table, so that the corresponding sub-block sizes and/or the size partition ratios may be determined according to the MCS index or its corresponding parameters.

In the above implementation manner of determining the respective sub-block sizes through the MCS index and/or corresponding parameters, the MCS and/or corresponding parameters may be included in the corresponding MCS table.

In one example, the corresponding modulation and coding scheme table may be a second modulation and coding scheme table obtained by changing parameters corresponding to one or more modulation and coding scheme indexes in a first modulation and coding scheme table. The first modulation and coding scheme table may be one or more of existing MCS tables, for example, one or more of respective MCS tables in Rel-15NR.

In another example, the corresponding modulation and coding scheme table may be a third modulation and coding scheme table obtained by adding one or more modulation and coding scheme indexes and parameters corresponding to the one or more modulation and coding scheme indexes to the first modulation and coding scheme table.

In another example, the corresponding modulation and coding scheme table may be at least one fourth modulation and coding scheme table separated from the first modulation and coding scheme table and obtained by constructing based on the modulation and coding scheme indexes and parameters corresponding to modulation and coding scheme indexes. The first modulation and coding scheme table and the at least one fourth modulation and coding scheme tables correspond to different channel conditions and/or channel quality feedback conditions, respectively. In this case, tables in the first modulation and coding scheme table and the at least one fourth modulation and coding scheme table may be selected according to the channel conditions and/or channel quality feedback conditions. For example, a plurality of the first tables may be set, corresponding respectively to situations such as higher spectral efficiency and lower spectral efficiency, etc., and a plurality of the fourth tables may be set, each corresponding to situations such as higher spectral efficiency and lower spectral efficiency, etc. In this way, for scenarios with channel conditions (lower reliability requirements) and channel quality feedback conditions (shorter CQI reporting periods), a table with higher spectral efficiency in the existing first modulation and coding scheme table may be selected; for scenarios with higher reliability requirements and shorter CQI reporting periods, a table with lower spectral efficiency in the existing first modulation and coding scheme table may be selected; for scenarios with lower reliability requirements and longer CQI reporting periods, a table with higher spectral efficiency in a newly-created fourth modulation and coding scheme table may be selected; for scenarios with higher reliability requirements and longer CQI reporting periods, a table with lower spectral efficiency in the fourth modulation and coding scheme table may be selected. Of course, the content about the channel conditions and the channel quality feedback conditions described above are merely examples. In actual application scenarios, the modulation and coding scheme table may be selected according to any channel conditions and channel quality feedback conditions.

The second modulation and coding scheme table, the third modulation and coding scheme table, and the fourth modulation and coding scheme table described above will be described in detail later. In addition, the first modulation and coding scheme table, the second modulation and coding scheme table, the third modulation and coding scheme table, and the fourth modulation and coding scheme table may exist simultaneously, or only a part of the tables may exist. Optionally, the selection information used by the base station to select the foregoing tables may be indicated to the user equipment through indication information or RRC signaling, etc., to inform which table is selected for division and/or modulation. Of course, the selection information for the tables may also be determined by the user equipment and fed back to the base station, which is not limited herein. In addition, when the tables are selected by the user equipment but not notified to the base station, the base station may also receive transmission data transmitted by the user equipment through a blind detection method and the like to determine the modulation and coding scheme of the transmission data.

The receiving unit 1920 is configured to receive transmission data of the user equipment, the transmission data being generated by the user equipment splitting the information block to be transmitted into the plurality of sub-blocks according to the indication information and processing respective sub-blocks.

As described above, the indication information may include sizes or size partition ratios corresponding to respective sub-blocks. When the indication information includes sizes corresponding to respective sub-blocks, the information block to be transmitted may be directly split into the plurality of sub-blocks according to the sizes.

When the indication information includes size partition ratios corresponding to respective sub-blocks, the information block to be transmitted may be split into the plurality of sub-blocks in the following manner.

Specifically, in order to ensure the correctness of the data, in the case of transmitting the entire information block to be transmitted, additional bits (such as cyclic redundancy check (CRC) bits or other types of additional bits) need to be additionally transmitted for the information block to be transmitted, and then the information block may be transmitted. On the other hand, in the embodiments of the present invention, the information block to be transmitted is split into the plurality of sub-blocks for transmission, so it is necessary to additionally transmit additional bits to each sub-blocks for transmission. Considering the transmitting additional bits, various division methods may be adopted, for example, the following two example methods are used to split the information block to be transmitted.

Specifically, the information block size of the information block to be transmitted may be expressed as $N_{info}$. On this basis, when the information block to be transmitted of size $N_{info}$ is split into L (L≥1) sub-blocks, the sub-block sizes of respective sub-blocks may be expressed as $N_1, N_2, \ldots, N_L$, respectively.

In one implementation manner, the information block size of the information block to be transmitted may be equal to a sum of sub-block sizes of the respective sub-blocks, that is, $\Sigma_{l=1}^{L} N_l = N_{info}$. This example may transmit all the bits in the information block to be transmitted through the plurality of split sub-blocks, thereby ensuring the integrity of the content of the final transmitted data. Specifically, after knowing the information block size $N_{info}$ of the information block to be transmitted and the size partition ratio $W_l$ corresponding to respective sub-blocks, a sub-block calculation size of the $l^{th}$ sub-block may be expressed as $N'_l = N_{info} W_l$, 1≤l≤L. In this way, on the premise that the information block size of the information block to be transmitted is equal to the sum of the sub-block sizes of the respective sub-block, it is possible to ensure that the size partition ratios corresponding to respective sub-blocks are closest to the requirements of the actual application scenarios.

In another example, a sum of the information block size of the information block to be transmitted and a transmission additional bit length of the information block to be transmitted is equal to a sum of sub-block sizes of the respective sub-blocks and transmission additional bit lengths of the respective sub-blocks. This example may ensure that the number of bits of the transmitted data transmitted after the division is the same as that of the information block to be transmitted, thereby ensuring the same spectral efficiency. In another implementation manner, the sum of the information block size of the information block to be transmitted and the transmission additional bit length of the information block to be transmitted is equal to the sum of sub-block sizes of the respective sub-blocks and the transmission additional bit lengths of the respective sub-blocks. When it is satisfied that the sum of the information block size of the information block to be transmitted and the transmission additional bit length of the information block to be transmitted is equal to the sum of sub-block sizes of the respective sub-blocks and the transmission additional bit lengths of the respective sub-blocks, the information block size to be transmitted and each sub-block may be expressed as: $\Sigma_{l=1}^{L}(N_l + CRC_l) = N_{info} + CRC_{info}$, where $CRC_l$ is the length of the transmission additional bits of the $l^{th}$ sub-block, and $CRC_{info}$ is the length of the transmission additional bits of the information block to be transmitted. In this way, on the premise that the sum of the information block size of the information block to be transmitted and the transmission additional bit length of the information block to be transmitted is equal to the sum of sub-block sizes of the respective sub-blocks and the transmission additional bit lengths of the respective sub-blocks, it is possible to ensure that the size partition ratios corresponding to respective sub-blocks are closest to the requirements of the actual application scenarios.

In a second implementation manner of the embodiments of the present invention, when the indication information includes the modulation and coding scheme index (MCS index) and/or the parameters (for example, modulation order, target bit rate and/or spectral efficiency, etc., or constellation mapping information mentioned later) corresponding to the MCS index in a modulation and coding scheme table, as an example, the MCS index and/or the corresponding parameters may correspond to the indexes of the sub-block sizes in the TBS partition table, so that the splitting the information block to be transmitted into the plurality of sub-blocks according to the indication information may include: obtaining indexes of sub-block sizes corresponding to the modulation and coding scheme index and/or parameters corresponding to the modulation and coding scheme index according to the modulation and coding scheme index and/or parameters corresponding to the modulation and coding scheme index, and determining sub-block sizes of the respective sub-blocks according to the indexes of sub-block sizes. The modulation and coding scheme table corresponding to the MCS index and/or the corresponding parameters may include the aforementioned first modulation and coding scheme table, the second modulation and coding scheme table, the third modulation and coding scheme table, and/or the fourth modulation and coding scheme table.

FIG. 3(a) shows a schematic diagram of correspondence relationship between TBS index and MCS index according to the above implementation manner of the present invention; FIG. 3(b) shows one example of a TBS partition table according to the above implementation manner of the present invention. As shown in FIG. 3(a), after the MCS index is directly obtained according to the indication information, or the corresponding MCS index is obtained according to the parameters corresponding to the MCS index, the TBS index corresponding to the MCS index may be determined according to the correspondence relationship between the TBS index and the MCS index. Subsequently, the size partition ratios of respective sub-blocks corresponding to the TBS index may be determined according to the TBS partition table in FIG. 3(b). Then, according to the manner described above, the information block to be transmitted is split into the plurality of sub-blocks according to the size partition ratios of respective sub-blocks. Of course, FIG. 3(a) and FIG. 3(b) are only examples. In actual applications, the corresponding relationship in FIG. 3(a) and FIG. 3(b) may be expressed in any way. For example, it is also possible to use only one table to represent the contents of FIG. 3(a) and FIG. 3(b). In addition, the TBS partition table in FIG. 3(b) may not show the size partition ratios of the sub-blocks, but may be replaced with other parameters, such as the specific number of bits of respective sub-block sizes. The mapping relationship in FIG. 3(a) and/or FIG. 3(b) may be stored in advance at both ends of the base station and the user equipment, or may be signaled to the user equipment by the base station, or may be reported in advance by the user equipment to the base station, which is not limited herein.

In one implementation manner, the respective sub-blocks may be modulated by using a first type of modulation manner, respectively. The first type of modulation manner may be a relatively low-order modulation manner. The low-order modulation here and the subsequent high-order modulation are relative concepts, and are not strict limitations on the modulation manner. In this example, a relatively low-order constellation may be used for mapping for respective sub-blocks, respectively, and the mapping manner for respective sub-blocks may be the same or different. Subsequently, respective modulated sub-blocks may also be processed with signature (such as multiple access signature (MA signature)), respectively, and other processing (if any) may be performed on the processed transmission data, and then the processed transmission data may be combined into a single data sequence and transmitted out. The signature may include information indicating at least one of a power, a spreading sequence, a scrambling sequence, and an interleaving pattern and the like set for the corresponding sub-blocks, or may be other information specific to the corresponding sub-blocks, which is not limited herein. FIG. 4 shows a schematic diagram of modulating the respective sub-blocks by using a first type of modulation manner respectively according to this example of the present invention. As shown in FIG. 4, after the information block to be transmitted is split into sub-blocks 1 to L, respective sub-blocks may be modulated by using the first type of modulation manner, respectively, and respective modulated sub-blocks is processed by using the multiple access signature (MA signature), respectively. Then the processed sub-blocks are combined into a single data sequence, which is transmitted out as the transmission data. In one example, the user equipment may perform channel coding on respective sub-blocks after splitting the information block to be transmitted into the plurality of sub-blocks, and before modulating the respective sub-blocks by using the first type of modulation manner respectively. Optionally, respective sub-blocks may be encoded by using a forward error correction code (FEC). For example, respective sub-blocks may be encoded by additionally transmitting additional bits (such as cyclic redundancy check (CRC) bits or other types of additional bits). And then the encoded sub-blocks are respectively modulated by using the first type of modulation manner, respectively. In another example, before the information block to be transmitted is split into the plurality of sub-blocks, channel coding such as the forward error correction code (FEC) may be performed on the information block to be transmitted. Optionally, the information block to be transmitted may be encoded by additionally transmitting additional bits (such as cyclic redundancy check (CRC) bits or other types of additional bits), and then the encoded information block to be transmitted may be split into sub-blocks and the sub-blocks are modulated by using the first type of modulation manner, respectively.

In another implementation manner, the respective sub-blocks may also be converted into a single data sequence, and the single data sequence may be modulated by using a second type of modulation manner. Specifically, the bits in respective sub-blocks may be converted into the single data sequence by parallel-to-serial conversion, and the bits in the single data sequence may be derived from the corresponding sub-block according to the size partition ratios of respective sub-blocks. For example, when the first sub-block size is twice of the second sub-block size, the bits of the first sub-block and the second sub-block may be extracted respectively in the manner of 2:1, for example, to form the respective bits of the single data sequence. That is, two bits of the first sub-block may be extracted, and then one bit of the second sub-block may be extracted to form three bits of the single data sequence. Then, in a similar way, continue to extract the subsequent two bits of the first sub-block and the subsequent one bit of the second sub-block to form the subsequent three bits of the single data sequence, and so on. After converting respective sub-blocks into the single data sequence, the single data sequence may be modulated by using the second type of modulation manner. The second type of modulation manner may be a relatively high-order modulation manner. The high-order modulation here is also a relative concept, and is not a strict limitation on the modulation manner. In this example, a relatively high-order constellation may be used for mapping for the single data sequence, and then, after the modulation, the single data sequence may be processed with the signature (such as multiple access signature (MA signature)) and then the processed transmission data may be transmitted out. For example, the MA signature may include information indicating at least one of the power, the spreading sequence, the scrambling code sequence, and the interleaving pattern and the like. Of course, the MA signature may not include the foregoing information, which is no limited herein. FIG. 5 shows a schematic diagram of modulating of converted single data sequence by using the second type modulation manner according to this example of the present invention. As shown in FIG. 5, after the information block to be transmitted is split into sub-blocks 1 to L, respective sub-blocks may be converted into the single data sequence by parallel-to-serial conversion, and the data sequence may be modulated by using the second type of modulation manner. Subsequently, the modulated result may also be processed by using the multiple access signature (MA signature) and transmitted out as the transmission data. In one example, the user equipment may perform channel coding on each respective sub-blocks after splitting the information block to be transmitted into the plurality of sub-blocks, and before converting respective sub-blocks into the single data sequence and modulating the single data sequence by using the second type modulation manner. Optionally, respective sub-blocks may be encoded by using the forward error correction code (FEC). For example, respective sub-blocks may be encoded by additionally transmitting additional bits (such as cyclic redundancy check (CRC) bits or other types of additional bits). And then the encoded sub-blocks are converted into the single data sequence and modulated by using the second type of modulation manner. In another example, before the information block to be transmitted is split into the plurality of sub-blocks, channel coding such as the forward error correction code (FEC) may be performed on the information block to be transmitted. Optionally, the information block to be transmitted may be encoded by additionally transmitting additional bits (such as cyclic redundancy check (CRC) bits or other types of additional bits), and then the encoded information block to be transmitted may be split into sub-blocks and converted into the data sequence, to perform modulating by using the second type of modulation manner.

Optionally, parameters corresponding to the modulation and coding scheme index value include the constellation mapping information; and the transmission data is generated by mapping the single bit sequence by using the constellation mapping information.

In one example, the relatively higher-order constellation used in the second type of modulation manner may be one of the existing constellations such as 8QAM, 16QAM, 64QAM, 128QAM, and the like. At this time, the constellation mapping information may include information of an initial constellation, so that the initial constellation is used for mapping. At this time, the single data sequence may be split into a plurality of sub-channels, and different sub-channels of the single data sequence may be mapped using the initial constellation. In this case, the constellation mapping information may further include the number of bits in the single data sequence that respectively correspond to different sub-channels, or the sequence numbers of different sub-channels corresponding to each bit in the single data sequence, respectively. For example, when a 16QAM constellation is used to map one group of data sequence containing 4-bits, two sub-channels may be defined, where one sub-channel has 1 bit, and the other sub-channel has 3 bits. Then, the constellation mapping information may be expressed as: (16Q, 1, 3), which respectively represent a 16QAM constellation, one bit in one bit group which is the first sub-channel, and three bits which are the second sub-channel. Alternatively, the constellation mapping information may be expressed as (16Q, 1, 2, 2, 2), which respectively represents a 16QAM constellation, the first bit in one bit group which is the first sub-channel, and the second to fourth bits which are the second sub-channel. At this time, since the second sub-channel has more bits than the first sub-channel, the second sub-channel has a larger capacity than the first sub-channel, and thus has higher reliability when transmitting the same amount of information. Therefore, data with higher priority may be mapped to the second sub-channel, and data with lower priority may be mapped to the first sub-channel. Each sub-channel may transmit independent coded codewords.

Alternatively, the relatively higher-order constellation used in the second type of modulation manner may be a synthetic constellation generated according to the constellation mapping information. In one example, the constellation mapping information may include information of one or more initial constellations and/or adjustment factors corresponding to the initial constellations, wherein the adjustment factors may include power ratios and/or rotation angles corresponding to the initial constellations. Therefore, the modulating the single data sequence by using the second type of modulation manner may include: generating a synthetic constellation by using the information of the initial constellation, the power ratios and/or the rotation angles corresponding to the initial constellations, and mapping the single data sequence by using the synthetic constellations. In the above example, the information of the initial constellations may be information representing one or more of constellations such as BPSK, QPSK, 16QAM, 64QAM, 128QAM, etc. In addition, the information of the initial constellations may also represent information of bits of a constellation indicated by the initial constellations. For example, $b_1$, $b_2$, $b_3$, $b_4$, etc. may be used to represent each bit. Further, $B(b_1)$, $Q(b_1, b_2)$ or $16Q(b_1, b_2, b_3, b_4)$ may be used as information of the initial constellations, where $B(b_1)$ represents BPSK for $b_1$, $Q(b_1, b_2)$ may represent QPSK for $b_1$, $b_2$, and $16Q(b_1, b_2, b_3, b_4)$ may represent 16QAM for $b_1$, $b_2$, $b_3$, $b_4$, and so on. Of course, the bit representation may also be omitted, and only B is used for BPSK, Q for QPSK, and 16Q/M for 16QAM. Taking the case where there are two initial constellations as an example, the power ratios corresponding to the two initial constellations may be $a_1$ and $a_2$, respectively, where $a_1$, $a_2 \in \mathbb{R}^+$, $|a_1|^2+|a_2|^2=1$, and the rotation angle $\Phi \in [0, 2\pi]$. The above power ratios and/or the rotation angle may be indicated by the base station according to the current channel feedback status and signaled to the user equipment, or may be determined by the user equipment itself, which is not limited herein. Optionally, when the single data sequence includes a plurality of bits in group of 2 bits, assuming that the information of the initial constellations is (B, B, $a_1$, $a_2$, $\varphi$), then the synthesized constellation may be expressed as $x=a_1 B(b_1)+a_2 e^{-i\varphi} B(b_2)$. When the single data sequence contains groups of 4 bits, assuming that the information of the initial constellations is (Q, Q, $a_1$, $a_2$, $\varphi$), then the synthetic constellation may be expressed as $x=a_1 Q(b_1, b_2)+a_2 e^{-i\varphi} Q(b_3, b_4)$. When the single data sequence contains groups of 6 bits, assuming that the information of the initial constellations is (Q, M, $a_1$, $a_2$, $\varphi$), then the synthetic constellation may be expressed as $x=a_1 Q(b_1, b_2)+a_2 e^{-i\varphi} M(b_3, b_4, b_5, b_6)$. When the single data sequence contains groups of 8 bits, it may be assumed that the information of the initial constellations is (M, M, $a_1$, $a_2$, $\varphi$), then the synthetic constellation may be expressed as $x=a_1 M(b_1, b_2, b_3, b_4)+a_2 e^{-i\varphi} M(b_5, b_6, b_7, b_8)$. FIGS. 6 to 8 show three examples of the synthetic constellation according to the embodiment of the present invention, where the synthetic constellation in FIG. 6 is composed of two BPSK constellations, and the BPSK constellation with a power ratio of $a_2$ is rotated by $\varphi=45°$. The synthetic constellation in FIG. 7 is composed of BPSK and QPSK constellations, and the QPSK constellation is rotated by $\varphi=45°$. The synthetic constellation in FIG. 8 is composed of two QPSK constellations, and the QPSK constellation with a power ratio of $a_2$ is rotated by $\varphi=45°$. As in the synthetic constellation shown in FIGS. 6-8, the distance between each constellation point may be adjusted by adjusting values of the power factors $a_1$ and $a_2$, so as to obtain different reliabilities corresponding to different sub-channels, to achieve rate division and thereby avoiding degradation of channel transmission performance and capacity due to channel conditions or channel feedback.

In one example, the constellation mapping information may be from the parameters corresponding to the aforementioned modulation and coding scheme index. Specifically, the indication information may indicate the constellation mapping information included in the corresponding modulation and coding scheme table by indicating a modulation and coding scheme index and/or parameters corresponding to the modulation and coding scheme index in the modulation and coding scheme table.

In another example, the constellation mapping information may be constructed into one or more constellation mapping information tables, and the constellation mapping information table may include information such as the initial constellation information, the power ratios and/or rotation angles corresponding to the initial constellation. Therefore, the indication information may be indication information for indicating the constellation mapping information in the constellation mapping information table. For example, the indication information may indicate the initial constellation information in the constellation mapping information, the power ratios and/or the rotation angles corresponding to the initial constellation, through indexes in the constellation mapping information table. Optionally, the constellation mapping information table may include information on the power ratios and/or rotation angles corresponding to the initial constellation, and the indication information may indicate the power ratios and/or rotation angles corresponding to the initial constellations in the constellation mapping information through indexes in the constellation mapping information table. In this example, the initial constellation information may be separately indicated through signaling such as RRC. FIG. 9 shows a constellation mapping information table according to one embodiment of the present invention. The constellation mapping information table shown in FIG. 9 includes the power ratios and rotation angles corresponding to the initial constellation. Specifically, the power ratios and rotation angles information in the constellation mapping information table may be determined by using the constellation mapping information index transmitted by the indication information. For example, through the index 1 in the constellation mapping information table, the indication information may indicate that the power ratio of $a_1$ and $a_2$ is 2:1, and the rotation angle $\varphi$ is $\pi/4$.

According to the base station of the embodiments of the present invention, the information block to be transmitted of the user equipment may be split into the plurality of sub-blocks by using the indication information transmitted by the base station, and each sub-block is processed accordingly, so that it can be adapted to different wireless network channel conditions to transmit information and improve channel transmission quality.

<Hardware Structure>

For example, the transmitting equipment and the receiving equipment, and the like in the embodiment of the present invention can function as a computer that executes processing of the wireless communication method of the present invention. FIG. 12 is a diagram illustrating an example of a hardware configuration of a related transmitting equipment and receiving equipment according to an embodiment of the present invention. The user equipment 1800 and base station 1900 described above may be physically designed as a computer apparatus including a processor 2010, a memory 2020, a storage 2030, a communication apparatus 2040, an input apparatus 2050, an output apparatus 2060, and a bus 2070 and the like.

It should be noted that, in the following description, the word "apparatus" may be replaced by "circuit", "device", "unit" and so on. It should be noted that the hardware structure of the user equipment 1800 and the base station 1900 may be designed to include one or more of each apparatus shown in the drawings, or may be designed not to include part of the apparatus.

For example, although only one processor 2010 is shown, a plurality of processors may be provided. Furthermore, processes may be implemented with one processor, or processes may be implemented either simultaneously or in sequence, or in different manners, on two or more processors. It should be noted that the processor 2010 may be implemented with one or more chips.

Each function of the user equipment 1800 and the base station 1900 is implemented by reading predetermined software (program) on hardware such as the processor 2010 and the memory 2020, so as to make the processor 2010 perform calculations, and by controlling the communication carried out by the communication apparatus 2040, and the reading and/or writing of data in the memory 2020 and the storage 2030.

The processor 2010 may control the whole computer by, for example, running an operating system. The processor 2010 may be configured with a central processing unit (CPU), which includes interfaces with peripheral apparatus, control apparatus, computing apparatus, a register and so on.

Furthermore, the processor 2010 reads programs (program codes), software modules or data, from the storage 2030 and/or the communication apparatus 2040, into the memory 2020, and executes various processes according to these. As for the programs, programs to allow computers to execute at least part of the operations of the above-described embodiments may be used.

The memory 2020 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 2020 may be referred to as a "register", a "cache", a "main memory" (primary storage apparatus) and so on. The memory 2020 can store executable programs (program codes), software modules and so on for implementing the wireless communication methods according to embodiments of the present invention.

The storage 2030 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 2030 may be referred to as "secondary storage apparatus."

The communication apparatus 2040 is hardware (transmitting/receiving device) for allowing inter-computer communication by using wired and/or wireless networks, and may be referred to as, for example, a "network device", a "network controller", a "network card", a "communication module" and so on. The communication apparatus 2040 may be configured to include a high frequency switch, a duplexer, a filter, a frequency synthesizer and so on in order to realize, for example, frequency division duplex (FDD) and/or time division duplex (TDD).

The input apparatus 2050 is an input device for receiving input from the outside (for example, a keyboard, a mouse, a microphone, a switch, a button, a sensor and so on). The output apparatus 2060 is an output device for allowing sending output to the outside (for example, a display, a speaker, an LED (Light Emitting Diode) lamp and so on). It should be noted that the input apparatus 2050 and the output apparatus 2060 may be provided in an integrated structure (for example, a touch panel).

Furthermore, these pieces of apparatus, including the processor 2010, the memory 2020 and so on are connected by the bus 2070 so as to communicate information. The bus 2070 may be formed with a single bus, or may be formed with buses that vary between pieces of apparatus.

Also, the user equipment 1800 and the base station may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 2010 may be installed with at least one of these pieces of hardware.

<Variations>

In addition, it should be noted that the terms illustrated in the present specification and/or the terms required for the understanding of the present specification may be substituted with terms having the same or similar meaning. For example, a channel and/or a symbol may be a signal. In addition, the signal may be a message. A reference signal may be abbreviated as an "RS (Reference Signal)", and may be referred to as a "pilot", a "pilot signal" and so on, depending on which standard applies. In addition, a component carrier (CC) may be referred to as a carrier frequency, a cell, or the like.

In addition, the wireless frame may be composed of one or more periods (frames) in the time domain. Each of the one or more periods (frames) constituting the wireless frame may also be referred to as a subframe. Further, a subframe may be composed of one or more slots in the time domain. The subframe may be a fixed length of time duration (eg, 1 ms) that is independent of the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Furthermore, the slot may also be a time unit configured based on parameter. Furthermore, a slot may also include multiple mini-slots. Each mini-slot may be comprised of one or more symbols in the time domain. Furthermore, a mini-slot may also be referred as "a subframe".

A wireless frame, a subframe, a slot, a mini-slot and a symbol all represent the time unit when transmitting signals. A wireless frame, a subframe, a slot, a mini-slot and a symbol may also use other names that correspond to each other. For example, one subframe may be referred to as a "transmission time interval (TTI)", and a plurality of consecutive subframes may also be referred to as a "TTI", and one slot or one mini-slot may also be referred to as a "TTI." That is, a subframe and/or a TTI may be a subframe (1 ms) in existing LTE, may be a shorter period than 1 ms (for example, one to thirteen symbols), or may be a longer period of time than 1 ms. It should be noted that a unit indicating a TTI may also be referred to as a slot, a mini-slot, or the like instead of a subframe.

Here, a TTI refers to the minimum time unit of scheduling in wireless communication, for example. For example, in LTE systems, a wireless base station schedules the wireless resources (such as the frequency bandwidth and transmission power that can be used in each user terminal) to allocate to each user terminal in TTI units. It should be noted that the definition of TTIs is not limited to this.

TTIs may be channel-coded data packets (transport blocks), code blocks, and/or codeword transmission time units, or may be the unit of processing in scheduling, link adaptation and so on. It should be noted that, when a TTI is given, the time interval (e.g., the number of symbols) actually mapped to the transport block, code block, and/or codeword may also be shorter than the TTI.

It should be noted that, when one slot or one mini-slot is called a TTI, more than one TTI (i.e., more than one slot or more than one mini-slot) may also become the scheduled minimum time unit. Furthermore, the number of slots (the number of mini-slots) constituting the minimum time unit of the scheduling may be controlled.

A TTI having a time duration of 1 ms may be referred to as a "normal TTI" (TTI in LTE Rel. 8 to 12), a "standard TTI", a "long TTI", a "normal subframe", a "standard subframe", or a "long subframe", and so on. A TTI that is shorter than a normal TTI may be referred to as a "shortened TTI", a "short TTI", a "partial (or fractional) TTI", a "shortened subframe", a "short subframe", a "mini-slot", or a "short mini-slot" and so on.

It should be noted that, a long TTI (eg, a normal TTI, a subframe, etc.) may be replaced with a TTI having a time duration exceeding 1 ms, and a short TTI (eg, a shortened TTI, and so on) may also be replaced with a TTI having a TTI duration shorter than the long TTI and a TTI duration exceeding 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one mini-slot, one subframe or one TTI duration. One TTI and one subframe each may be comprised of one or more resource blocks, respectively. It should be noted that one or more RBs may also be referred to as a "physical resource block (PRB (Physical RB))", a "Sub-Carrier Group (SCG)", a "Resource Element Group (REG)", a "PRG pair", an "RB pair" and so on.

Also, a resource block may also be composed of one or more resource elements (RE). For example, one RE can be a wireless resource area of a subcarrier and a symbol.

It should be noted that the above-described structures of wireless frames, subframes, slots, mini-slots and symbols and so on are simply examples. For example, configurations such as the number of subframes included in a wireless frame, the number of slots of each subframe or wireless frame, the number or mini-slots included in a slot, the number of symbols and RBs included in a slot or mini-slot, the number of subcarriers included in an RB, the number of symbols in a TTI, the symbol duration and the cyclic prefix (CP) duration can be variously changed.

Also, the information and parameters and so on described in this specification may be represented in absolute values or in relative values with respect to predetermined values, or may be represented in corresponding other information. For example, radio resources may be indicated by predetermined indices. In addition, equations to use these parameters and so on may be used, apart from those explicitly disclosed in this specification.

The names used for parameters and so on in this specification are not limited in any respect. For example, since various channels (PUCCH (Physical Uplink Control Channel), PDCCH (Physical Downlink Control Channel) and so on) and information elements can be identified by any suitable names, the various names assigned to these various channels and information elements are not limited in any respect.

The information, signals and so on described in this specification may be represented by using any one of various different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on that are input and/or output may be overwritten, updated or appended. The information, signals and so on that are output may be deleted. The information, signals and so on that are input may be transmitted to other apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBS) and so on), MAC (Medium Access Control) signaling and so on), and other signals and/or combinations of these.

It should be noted that physical layer signaling may also be referred to as L1/L2 (Layer 1/Layer 2) control information (L1/L2 control signals), L1 control information (L1 control signal) and so on. Also, RRC signaling may be referred to as "RRC messages", and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, a reporting "X") does not necessarily have to be carried out explicitly, and can be carried out implicitly (by, for example, not reporting this piece of information, or by reporting a different piece of information).

Regarding decisions, which may be made in values represented by one bit (0 or 1), may be made by a true or false value (Boolean value) represented by true or false, or may be made by comparing numerical values (for example, comparison against a predetermined value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are included in the definition of communication media.

The terms "system" and "network" as used herein are used interchangeably.

In the present specification, the terms "radio base station (BS)", "radio base station", "eNB", "gNB", "cell", "sector", "cell group", "carrier" and "component carrier" may be used interchangeably. A radio base station may be referred to as a "fixed station", "NodeB", "eNodeB (eNB)", "access point", "transmission point", "receiving point", "femto cell", "small cell" and so on.

A radio base station can accommodate one or more (for example, three) cells (also referred to as "sectors"). When a radio base station accommodates a plurality of cells, the entire coverage area of the radio base station can be partitioned into a plurality of smaller areas, and each smaller area can provide communication services with radio base station subsystems (for example, indoor small radio base stations (RRHs (Remote Radio Heads))). The term "cell" or "sector" refers to part or all of the coverage area of a radio base station and/or a radio base station subsystem that provides communication services within this coverage.

In the present specification, the terms "mobile station (MS)", "user terminal", "user equipment (UE)" and "terminal" may be used interchangeably. The radio base station is sometimes referred to by terms such as a fixed station, a NodeB, a eNodeB (eNB), an access point, an transmitting point, a receiving point, a femto cell, and small cell, and the like.

A mobile station is also sometimes used by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

Furthermore, both the user equipment 1800 and the base station 1900 in this specification may be replaced with the wireless base stations or user terminals.

In the present specification, it is assumed that certain actions to be performed by radio base station may, in some cases, be performed by its higher node (upper node). In a network comprised of one or more network nodes with base stations, it is clear that various operations that are performed to communicate with terminals can be performed by radio base stations, one or more network nodes (for example, MMES (Mobility Management Entities), S-GW (Serving-Gateways), and so on may be possible, but these are not limiting) other than radio base stations, or combinations of these.

The respective aspects/embodiments illustrated in this specification may be used individually or in combinations, which may also be switched and used during execution. The order of processes, sequences, flowcharts and so on of the respective aspects/embodiments described in the present specification may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000 (Code Division Multiple Access), UMB (Ultra Mobile Broadband), IEEE 802.11 (Wi-Fi (registered trademark)), IEEE 802.16 (WiMAX (registered trademark)), IEEE 920.20, UWB (Ultra-WideBand), Bluetooth (registered trademark) and other adequate radio communication methods, and/or next-generation systems that are enhanced based on these.

The phrase "based on" as used in this specification does not mean "based only on", unless otherwise specified. In other words, the phrase "based on" means both "based only on" and "based at least on."

Any reference to elements with designations such as "first", "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "including", "comprising" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

What is claimed is:

1. An information transmitting method performed by a user equipment, the method comprising:
   receiving indication information, the indication information indicating sub-block sizes of a plurality of sub-blocks obtained by splitting an information block to be transmitted;
   splitting the information block to be transmitted into the plurality of sub-blocks according to the indication information;
   processing respective sub-blocks to generate transmission data, and transmitting the transmission data,
   wherein, the indication information includes a modulation and coding scheme index and/or parameters corresponding to the modulation and coding scheme index in a modulation and coding scheme table; and
   the splitting the information block to be transmitted into the plurality of sub-blocks according to the indication information includes: obtaining indexes of sub-block sizes corresponding to the modulation and coding scheme index and/or parameters corresponding to the modulation and coding scheme index according to the modulation and coding scheme index and/or parameters corresponding to the modulation and coding scheme index, and determining sub-block sizes of the respective sub-blocks according to the indexes of sub-block sizes.

2. The method of claim 1, wherein,
   an information block size of the information block to be transmitted is equal to a sum of sub-block sizes of the respective sub-blocks; or
   a sum of the information block size of the information block to be transmitted and a transmission additional bit length of the information block to be transmitted is equal to a sum of sub-block sizes of the respective sub-blocks and transmission additional bit lengths of the respective sub-blocks.

3. The method of claim 1, wherein,
   the indication information includes size partition ratios corresponding to the respective sub-blocks.

4. The method of claim 1, wherein the processing respective sub-blocks comprises:
   modulating the respective sub-blocks by using a first type of modulation manner, respectively.

5. A user equipment comprising:
   a receiving unit configured to receive indication information, the indication information indicating sub-block sizes of a plurality of sub-blocks obtained by splitting an information block to be transmitted;
   a splitting unit configured to split the information block to be transmitted into the plurality of sub-blocks according to the indication information;
   a transmitting unit configured to process respective sub-blocks to generate transmission data, and transmitting the transmission data,
   wherein, the indication information includes a modulation and coding scheme index and/or parameters corresponding to the modulation and coding scheme index in a modulation and coding scheme table; and
   the splitting unit obtains indexes of sub-block sizes corresponding to the modulation and coding scheme index and/or parameters corresponding to the modulation and coding scheme index according to the modulation and coding scheme index and/or parameters corresponding to the modulation and coding scheme index, and determines sub-block sizes of the respective sub-blocks according to the indexes of sub-block sizes.

6. The user equipment of claim 5, wherein:
   a sum of an information block size of the information block to be transmitted and a transmission additional bit length of the information block to be transmitted is equal to a sum of sub-block sizes of the respective sub-blocks and transmission additional bit lengths of the respective sub-blocks; or
   an information block size of the information block to be transmitted is equal to a sum of sub-block sizes of the respective sub-blocks.

7. The user equipment of claim 5, wherein,
the indication information includes size partition ratios corresponding to the respective sub-blocks.

8. The user equipment of claim 5, wherein,
the transmitting unit modulates the respective sub-blocks by using a first type of modulation manner, respectively.

9. The user equipment of claim 5, wherein the modulation and coding scheme table is:
a second modulation and coding scheme table obtained by changing parameters corresponding to one or more modulation and coding scheme indexes in a first modulation and coding scheme table;
a third modulation and coding scheme table obtained by adding one or more modulation and coding scheme indexes and parameters corresponding to the one or more modulation and coding scheme indexes to the first modulation and coding scheme table; or
the modulation and coding scheme table is at least one fourth modulation and coding scheme table separated from the first modulation and coding scheme table and obtained by constructing based on the modulation and coding scheme indexes and parameters corresponding to the one or more modulation and coding scheme indexes, the first modulation and coding scheme table and the at least one fourth modulation and coding scheme tables corresponding to different channel conditions and/or channel quality feedback conditions, respectively.

10. The user equipment of claim 5, wherein,
the transmitting unit converts the respective sub-blocks into a single data sequence; and
modulates the single data sequence by using a second type of modulation manner.

11. The user equipment of claim 10, wherein,
the parameters corresponding to the modulation and coding scheme index include constellation mapping information; and
the transmitting unit modulates the single data sequence by using the constellation mapping information.

12. The user equipment of claim 11, wherein,
the constellation mapping information includes information of one or more initial constellations and/or adjustment factors corresponding to the initial constellations.

13. The user equipment of claim 12, wherein,
the adjustment factors include power ratios and/or rotation angles corresponding to the initial constellations.

14. The user equipment of claim 13, wherein,
the transmitting unit generates a synthetic constellation by using the information of the initial constellations, the power ratios and/or the rotation angles corresponding to the initial constellations, and maps the single data sequence by using the synthetic constellation.

15. The user equipment of claim 5, wherein,
the indication information includes indication information used to indicate constellation mapping information in a constellation mapping information table.

16. A base station comprising:
a transmitting unit configured to transmit indication information, the indication information indicating sub-block sizes of a plurality of sub-blocks obtained by splitting an information block to be transmitted by a user equipment;
a receiving unit configured to receive transmission data of the user equipment, the transmission data being generated by the user equipment splitting the information block to be transmitted into the plurality of sub-blocks according to the indication information and processing respective sub-blocks,
wherein, the indication information includes a modulation and coding scheme index and/or parameters corresponding to the modulation and coding scheme index in a modulation and coding scheme table; and
the receiving unit obtains indexes of sub-block sizes corresponding to the modulation and coding scheme index and/or parameters corresponding to the modulation and coding scheme index according to the modulation and coding scheme index and/or parameters corresponding to the modulation and coding scheme index, and determines sub-block sizes of the respective sub-blocks according to the indexes of sub-block sizes.

* * * * *